United States Patent
Kane et al.

(10) Patent No.: US 9,310,512 B1
(45) Date of Patent: Apr. 12, 2016

(54) METHODS AND SYSTEMS FOR DETECTION AND IDENTIFICATION OF CONCEALED MATERIALS

(71) Applicants: James A. Kane, Needham Heights, MA (US); Ranganathan Shashidhar, Needham Heights, MA (US); Timothy Bortz, Needham Heights, MA (US)

(72) Inventors: James A. Kane, Needham Heights, MA (US); Ranganathan Shashidhar, Needham Heights, MA (US); Timothy Bortz, Needham Heights, MA (US)

(73) Assignee: Polestar Technologies, Inc., Needham Heights, MA (US)

( * ) Notice: Subject to any disclaimer, the term of this patent is extended or adjusted under 35 U.S.C. 154(b) by 0 days.

(21) Appl. No.: 14/821,172

(22) Filed: Aug. 7, 2015

Related U.S. Application Data

(60) Provisional application No. 62/034,380, filed on Aug. 7, 2014.

(51) Int. Cl.
  *G01V 3/38* (2006.01)
  *G01V 3/12* (2006.01)
  *G01V 8/24* (2006.01)

(52) U.S. Cl.
  CPC .. *G01V 3/38* (2013.01); *G01V 3/12* (2013.01); *G01V 8/24* (2013.01)

(58) Field of Classification Search
  CPC ............. G01V 3/12; G01V 3/38; G01V 8/24
  See application file for complete search history.

(56) References Cited

U.S. PATENT DOCUMENTS

| | | | |
|---|---|---|---|
| 2012/0314836 A1* | 12/2012 | Smith | G01V 5/0025 378/57 |
| 2013/0015354 A1* | 1/2013 | Diamond | G01N 21/4795 250/339.07 |
| 2013/0120315 A1* | 5/2013 | Utukuri | G01V 8/20 345/175 |
| 2014/0014812 A1* | 1/2014 | Utukuri | G06F 3/0416 250/206.1 |
| 2014/0019085 A1* | 1/2014 | Utukuri | G06F 3/0421 702/151 |
| 2014/0060189 A1* | 3/2014 | Sausa | G01N 21/3563 73/579 |
| 2014/0226789 A1* | 8/2014 | Bendahan | G01N 23/203 378/86 |
| 2014/0253362 A1* | 9/2014 | Einat | G01V 8/005 342/27 |
| 2014/0270342 A1* | 9/2014 | Kane | G06K 9/4661 382/103 |

* cited by examiner

Primary Examiner — Mark R Gaworecki
(74) Attorney, Agent, or Firm — Burns & Levinson LLP; Orlando Lopez

(57) ABSTRACT

Methods and systems for efficiently and accurately detecting and identifying concealed materials. The system includes an analysis subsystem configured to process one or more detection outputs, the detection outputs obtained by illuminating regions with a electromagnetic radiation source from the number of electromagnetic radiation sources, each electromagnetic radiation source emitting at a different wavelength, the one or more detection outputs, after processing, constituting a vector of processed data, and the analysis subsystem being also configured to compare the vector of processed data to a predetermined vector corresponding to a predetermined material, presence of the predetermined material being determined by the comparison.

29 Claims, 18 Drawing Sheets

METHODS AND SYSTEMS FOR DETECTION AND IDENTIFICATION OF CONCEALED MATERIALS

CROSS REFERENCE TO RELATED APPLICATIONS

This application claims priority to U.S. Provisional Application No. 62/034,380, filed Aug. 7, 2014, entitled METHODS AND SYSTEMS FOR DETECTION AND IDENTIFICATION OF CONCEALED MATERIALS, which is incorporated by reference herein in its entirety for all purposes.

STATEMENT REGARDING FEDERALLY SPONSORED RESEARCH OR DEVELOPMENT

This invention was made partially with U.S. Government support from the Department of Homeland Security (DHS) under contract HSHQDC-13-C-00025. The U.S. Government may have certain rights in the invention.

BACKGROUND

These teachings relate generally to methods and systems for detecting concealed materials.

Numerous conventional approaches have been taken in the field of standoff detection and identification to attempt to detect and identify materials, especially explosives, drugs, etc., concealed under clothing. Such conventional approaches that have been reported in the literature for standoff detection and identification of concealed contraband materials include: x-ray backscatter imaging, neutron excited gamma ray emission spectroscopy, terahertz reflection spectroscopy, and laser induced breakdown spectroscopy.

Problems with the x-ray backscattering imaging approach include: poor chemical selectivity for chemical identification with high potential for false positives, large size and weight of instrumentation which prevents the system from being man-portable, and human health risk from x-ray exposure.

Problems with neutron excited gamma ray spectroscopy include: limited chemical selectivity resulting from the measurement only producing elemental concentration results, limited sensitivity, and long measurement times at significant standoff distances (i.e. 1 ft. or greater), and substantial human health risks. Measurements providing only elemental analysis information would not be likely to be able to identify explosive materials such as triacetaone-triperoxide that contain only the elements C, H, and O, and identification of drugs would be very difficult.

Problems with terahertz spectroscopy include: slow measurement time, as well as substantial problems with interference from absorption of terahertz radiation by atmospheric water vapor for standoff distances greater than 10 ft. In addition, the size and weight of the equipment are too great for man-portability.

Laser induced breakdown spectroscopy (LIBS) is a trace detection method that can detect and identify small particles of explosive or other materials on the outside of a surface in a standoff mode. The primary problem with LIBS is that it cannot detect or identify materials concealed underneath a covering layer such as cloth and can only detect explosive particles on the outside surface of clothing. Explosives or other contraband materials that are well sealed in a plastic bag and concealed under clothing, where the outside surface of the clothing was not contaminated with the dust of the contraband material, could not be detected or identified with LIBS.

Further, NIR spectroscopy has been used to identify chemical compounds. In particular, Li, et al. disclose a method of analyzing NIR data, so as to identify various solid forms of chemical compounds and drug candidates. This method includes the steps of: (1) computing the second derivative spectra for collected NIR spectra; (2) applying principal component analysis (PCA) of the second derivative spectra at predetermined wavelengths either the entire wavelength region or a selected wavelength region for segregating the samples; identifying the groups and group membership from the PCA graph, and further evaluating group members by calculating Mahalanobis distances of a given group to assess qualification of the group members. However, this method is merely an initial exploratory analysis of near-infrared spectra designed to identify how many different components or materials are present in an unknown sample, and how different their spectra are.

Additional conventional methods include using NIR spectroscopy to attempt to identify components relative to a saved calibration library, via identification of absorption wavelengths, and comparison thereof to known standards. For example, an explosive device detection method and system based on differential emissivity have been disclosed. This method and system monitors the emissivity levels of target subjects in monitored zones by repeatedly scanning the pixels of an infrared photodetector array, and then processing the pixel values to determine if they correspond to at least one calibrated emissivity level associated with a concealed explosive device. The calibration techniques of that method involve attempts to eliminate the effects of clothing and other personal items, as well as environmental factors, but suffer from a concentration mainly on differences in emissivity levels caused by distance of the target from the source (IR photodetector), rather than increasing the contrast/difference in measured emissivity between the covering materials and the concealed contraband materials.

Further, such conventional methods are inaccurate, when used to attempt to identify materials concealed under clothing, covering materials, etc., due to the difficulties inherent in filtering out the wavelengths reflected from the clothing, covering materials, containment materials, etc., as well as, importantly, ambient light, sunlight, etc. Thus, to obtain accurate measurements, such conventional NIR methods generally are confined to laboratory or laboratory-like environments, not public areas, such as airports.

In view of the above, there is a need for providing a method to efficiently and accurately detect and identify concealed materials, such as explosives, drugs, or hazardous materials, concealed on a person under clothing or in a backpack, or concealed in unattended paper, plastic, cloth or leather bags (including backpacks), and a system for carrying out same.

BRIEF SUMMARY

Methods and systems for efficiently and accurately detecting and identifying concealed materials are presented below.

In one or more embodiments, the system of these teachings includes a number of electromagnetic radiation sources, each electromagnetic radiation source having substantially one wavelength from a number of wavelengths, at least some of the number of wavelengths substantially coinciding with wavelengths in an absorption spectrum of predetermined materials, a non-pixelated detection component operatively disposed to receive electromagnetic radiation scattered or reflected from a region after illumination of the region by one or more electromagnetic radiation sources from the number of electromagnetic radiation sources, an analysis subsystem configured to process one or more detection outputs in order to obtain data at each wavelength from a plurality of wavelengths, the one or more detection outputs obtained by repeatedly or simultaneously illuminating regions with one or more electromagnetic radiation sources from the number of electromagnetic radiation sources, in order to obtain data at each wavelength from a plurality of wavelengths, each one of the number of electromagnetic radiation sources emitting with a different wavelength, the number of detection outputs, after processing, constituting a vector of processed data, the analysis subsystem being also configured to compare the vector of processed data to a predetermined vector corresponding to a predetermined material, presence of the predetermined material being determined by the comparison.

In one or more embodiments, the method of these teachings includes processing one or more detection outputs, the one or more detection outputs obtained by repeatedly or simultaneously illuminating regions with one or more electromagnetic radiation sources from a number of electromagnetic radiation sources, each electromagnetic radiation source having substantially one wavelength, each illumination performed with a different wavelength, and detecting reflected/scattered electromagnetic radiation from the area of interest, the reflected/scattered electromagnetic radiation from the area of interest being detected by a non-pixelated detecting component, the processing being performed in order to obtain data at each wavelength from a plurality of wavelengths, the one or more detection outputs, after processing, constituting a vector of processed data and comparing the vector of processed data to a predetermined vector corresponding to a predetermined material, presence of the predetermined material being determined by the comparison.

A number of other embodiments of the system and a method of these teachings are also disclosed.

For a better understanding of the present teachings, together with other and further needs thereof, reference is made to the accompanying drawings and detailed description and its scope will be pointed out in the appended claims.

DETAILED DESCRIPTION

Figure 1:
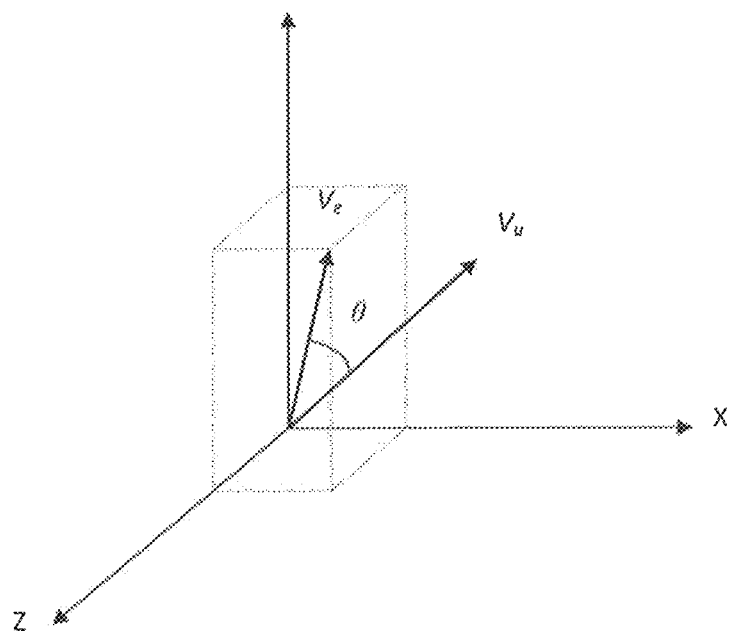
FIG. 1 shows an example vector in 3D vector space.

The following detailed description presents the currently contemplated modes of carrying out these teachings. The description is not to be taken in a limiting sense, but is made merely for the purpose of illustrating the general principles of these teachings.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

In order to elucidate the present teachings, the following definitions are provided.

A "projection," as used herein, is a measure of a portion of a number of values (sometimes referred as a vector) located along another number of values (sometimes referred to as another vector).

An "optical combiner," as used herein is a passive device in which emission from several sources (fibers in one embodiment) is distributed to one combination fiber.

In one or more embodiments, the system of these teachings includes a number of electromagnetic radiation sources, each electromagnetic radiation source having substantially one wavelength from a number of wavelengths, at least some of the number of wavelengths substantially coinciding with wavelengths in an absorption spectrum of predetermined materials, a non-pixelated detection component operatively disposed to receive electromagnetic radiation scattered or reflected from a region after illumination of the region by one or more electromagnetic radiation sources from the number of electromagnetic radiation sources, an analysis subsystem configured to process one or more detection outputs in order to obtain data at each wavelength from a plurality of wavelengths, the one or more detection outputs obtained by repeatedly or simultaneously illuminating regions with one or more electromagnetic radiation sources from the number of electromagnetic radiation sources, in order to obtain data at each wavelength from a plurality of wavelengths, each one of the number of electromagnetic radiation sources emitting with a different wavelength, the number of detection outputs, after processing, constituting a vector of processed data, the analysis subsystem being also configured to compare the vector of processed data to a predetermined vector corresponding to a predetermined material, presence of the predetermined material being determined by the comparison. In one embodiment, the non-pixelated detector component is an AC coupled non-pixelated detector component.

In one instance, each one of the number of the electromagnetic radiation sources sequentially illuminates an area of interest and the number of electromagnetic radiation sources emit substantially from one location. The detecting component receives reflected/scattered electromagnetic radiation from the area of interest. In that instance, processing includes using a lock-in detector in order to obtain the data at each wavelength from the number of wavelengths, the number of wavelengths being the plurality of wavelengths. (Digital lock-in detection is described, for example, in Implementing Digital Lock-In Using the dsPIC® DSC, Microchip Technology Inc. AN1115, 2007 and in Gang Li, Mei Zhou, Feng He, and Ling Lina, A novel algorithm combining oversampling and digital lock-in amplifier of high speed and precision, REVIEW OF SCIENTIFIC INSTRUMENTS 82, 095106 (2011), both of which are incorporated by reference herein in their entirety and for all purposes.)

In one instance, each one of the number of the electromagnetic radiation sources substantially simultaneously illuminates an area of interest and the number of electromagnetic radiation sources emit substantially from one location. The detecting component receives reflected/scattered electromagnetic radiation from the area of interest. In that instance, processing includes using a discrete Fourier transform (DFT) in order to obtain the data at each wavelength from the plurality of wavelengths, a wavelength range of the plurality of wavelengths being substantially equal to a wavelength range of the number of wavelengths.(For a description of the discrete Fourier transform, see, for example, Alan B Oppenheim, Ronald W Shafer, Digital Signal Processing, ISBN 0-13-214635-5, 1975, chapter 3, pp. 87-121, which is incorporated by reference herein in its entirety and for all purposes.)

In one instance, the system of these teachings also includes a targeting subsystem, the targeting subsystem including a targeting electromagnetic radiation source and a targeting detector component. In one embodiment, the targeting electromagnetic radiation source is a shorter wavelength laser source (the wavelengths being shorter than the wavelengths used in the electromagnetic radiation sources for detection). The targeting electromagnetic radiation source is configured to substantially avoid interaction with the detection component. The targeting electromagnetic radiation source can be configured by 1) using a wavelength that is undetected by the component or 2) only operating when the electromagnetic radiation sources used for detection are not in use or 3) operating in a DC mode making it essentially invisible to the AC coupled detector. In one instance, the targeting detector component is a camera (such as, but not limited to, a silicon-based camera) or night vision goggles or a cross-hair sight. In one embodiment, the targeting detector component also includes another imaging component (such as, but not limited to, a thermal camera).

In one instance, the wavelength range of the number of wavelengths of the number of electromagnetic radiation sources includes the range from about 1.1 micron to about 1.4 micron. Over this range cloth has very little optical absorption thus enabling light in this range to penetrate via multiple reflection and reemerge as a backscattered signal. The spectrum of the returned light can be affected by the spectral properties of any underlying (that is, concealed) materials such as explosives which is detectable by the system and method of the present teachings.

In one instance, the detector component includes collection optics. In one embodiment, the reflected or scattered targeting electromagnetic radiation is substantially co-aligned with an optical axis of the collection optics for the detector component. In one instance, co-alignment is obtained by use of a long pass dichroic beam splitter.

In one or more instances, the analysis subsystem (also referred to as a component) includes a background subtraction subcomponent configured for subtracting a background value from a value for detected reflected/scattered electromagnetic radiation, the background subtraction subcomponent producing a background subtracted value, a ratio intensity subcomponent configured for obtaining a number of ratio values, each ratio value being a ratio of a background subtracted value at one wavelength from the number of wavelengths to a background subtracted value at a selected wavelengths from the number of wavelengths, and a projection subcomponent configured for obtaining a measure of a portion of the number of ratio values located along predetermined values at the number of wavelengths for said predetermined materials.

In other instances, the analysis subsystem (also referred to as a component) also includes a normalizing subcomponent configured to normalize the background subtracted value with respect to a difference between a value for a measure of emission from the electromagnetic radiation source used to generate the image and a measure of background electromagnetic radiation.

In one embodiment, the system of these teachings also includes a timing component providing a signal for initiation of emission from a selected one of the electromagnetic radiation sources. The timing component also provides the initiation signal for initiating detection by the detection component. In one instance, the timing component also provides initiation signal to the analysis component (for example, in the case of a digital lock-in component).

Figure 3A:
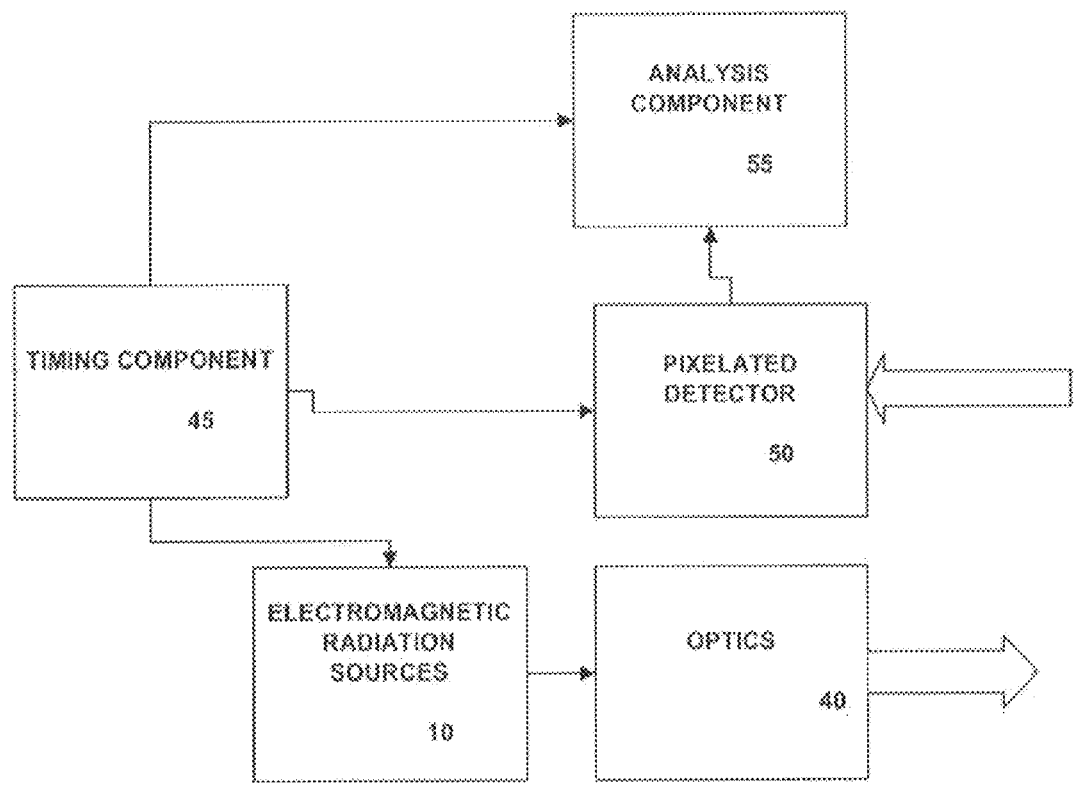
FIGS. 3a-3e show block diagram representations of the embodiments of the system of these teachings.

A block diagram representation of an embodiment of the system of these teachings is shown in FIG. 3a. Referring to FIG. 3a, in the embodiment shown therein, each one of a number of electromagnetic radiation sources 10, each electromagnetic radiation source having substantially one wavelength from a number of wavelengths, at least some of the number of wavelengths substantially coinciding with wavelengths in an absorption spectrum of predetermined materials, sequentially illuminates, through and optical subsystems 40, an area of interest. The number of electromagnetic radiation sources emit substantially from one location. The scattered/reflected electromagnetic radiation from the area of interest is received by the detector 50. A timing component 45 provides the initiation signal for an electromagnetic radiation source 10 and for the detector 50 and an analysis component 55, so that the detector 50 captures the scattered/reflected electromagnetic radiation resulting from elimination by the electromagnetic radiation source 10 at substantially one wavelength and the data from detector 50 is captured by the analysis subsystem 55. (In one embodiment, the detector component includes a photodetector such as, but not limited to, an InGaAs photodiode. The detector component can also include collection optics.) After the data has been collected for all the wavelengths from the number of wavelengths, the data can be represented as a vector, data at each wavelength being data at one component of the vector. The vector of processed data is compared in the analysis subsystem 55, in one instance, by means of a projection, to a predetermined vector corresponding to a predetermined material, presence of the predetermined material being determined by the comparison.

Figure 3B:
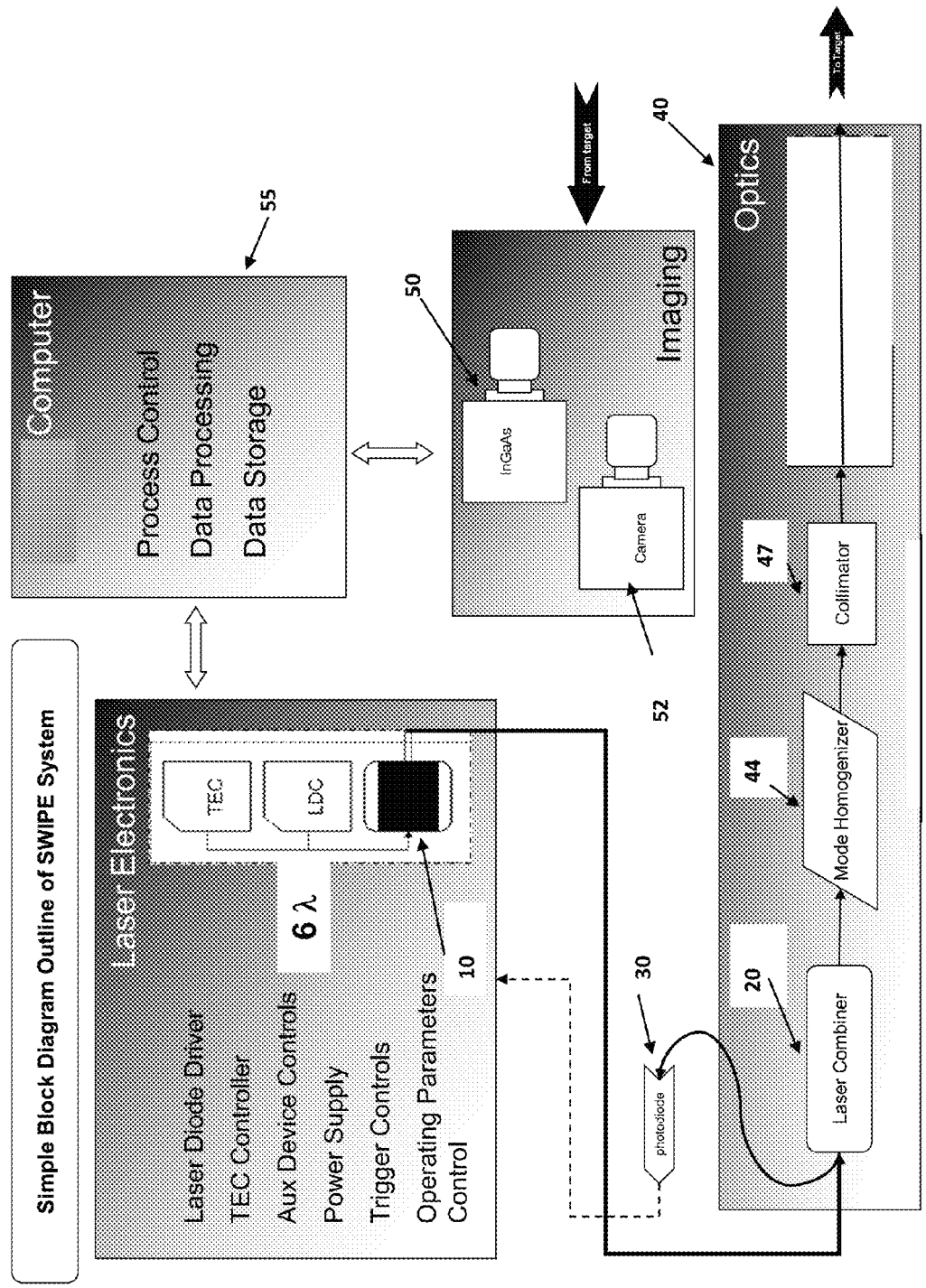
Figure 3C:
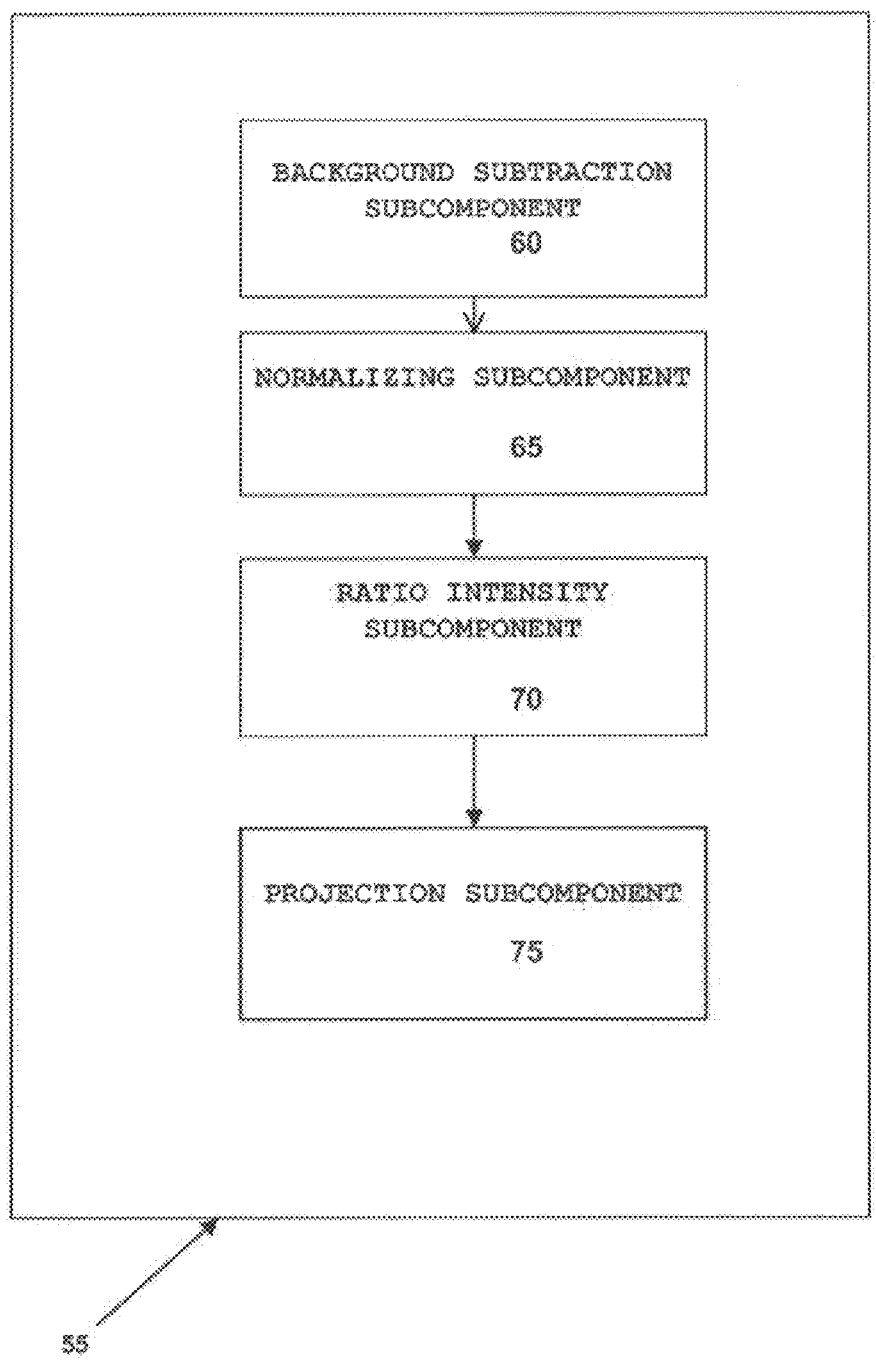
Figure 3D:
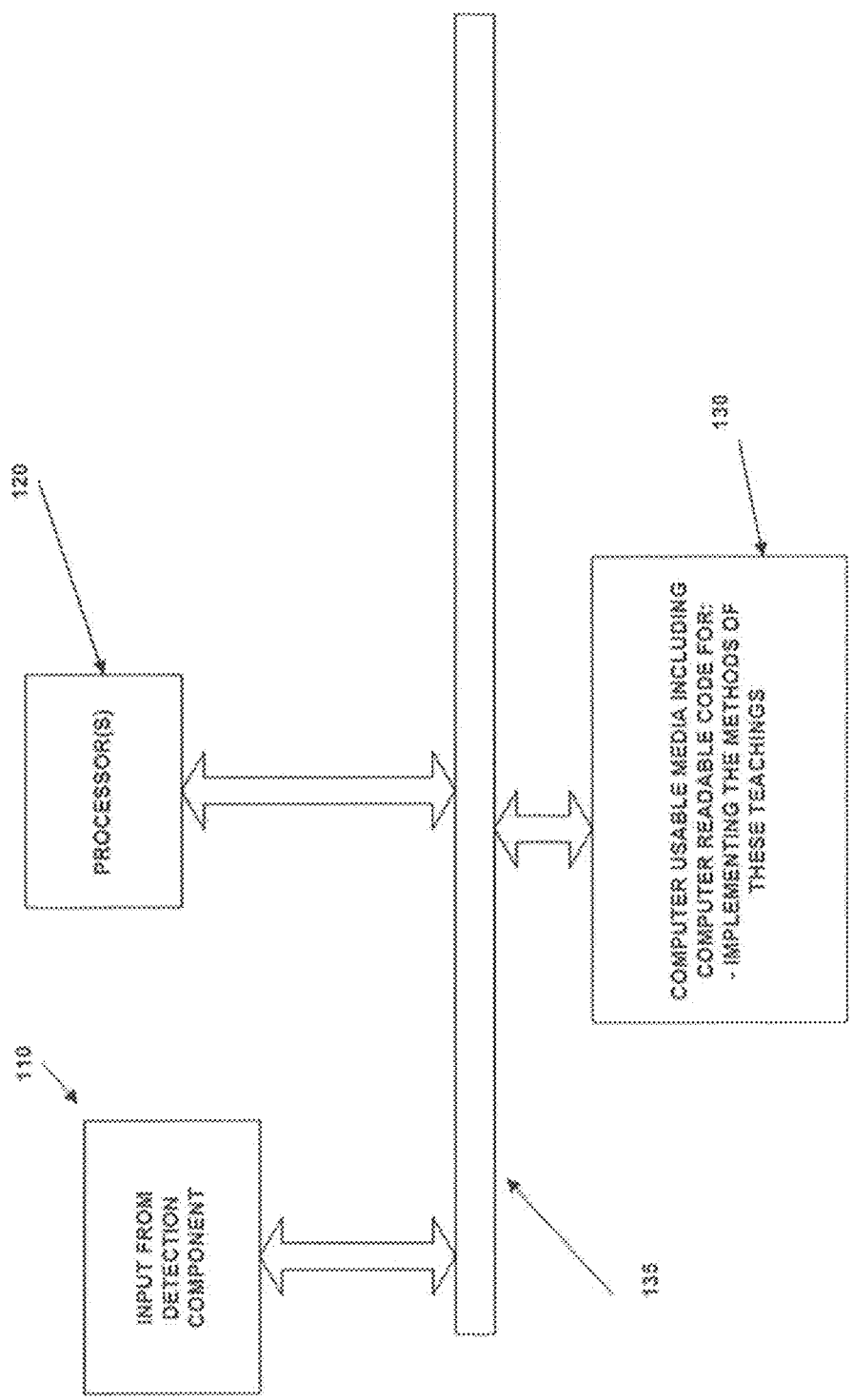
Figure 3E:
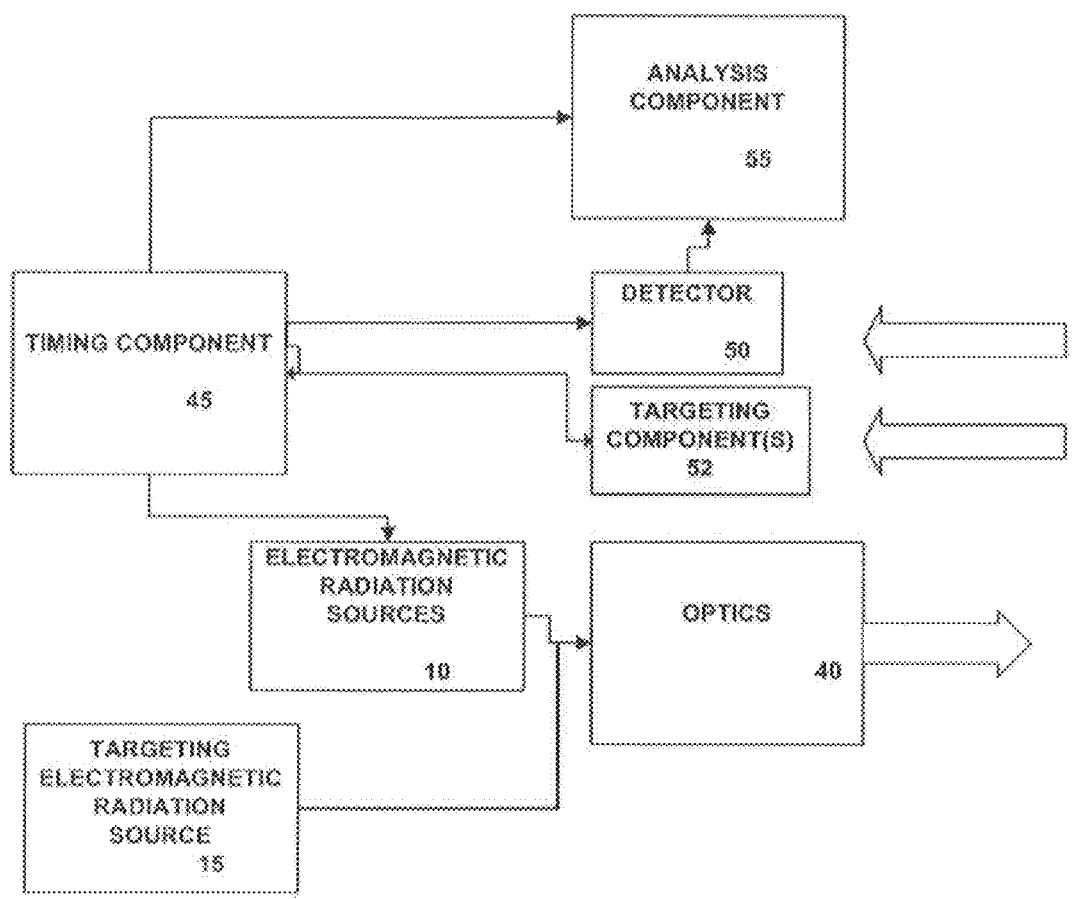

Another block diagram representation of an embodiment of the system of these teachings is shown in FIG. 3e. Referring to FIG. 3e, the embodiment shown therein also includes a targeting electromagnetic radiation source 15 and one or more targeting detector components 52. When the detector 50 is a photodetector (such as, but not limited to, an InGaAs photodiode), the targeting electromagnetic radiation source 15 and the one or more targeting detector components 52 enable identifying a location at which detection will occur. In one instance, the targeting detector component 52 includes a camera. In another instance, the targeting detector component includes night vision goggles. The choice of targeting detector component can be influenced by whether the system is stationary or mobile (such as, for example, handheld). If the system is stationary the collection optics in the detector 50 can be configured to be adjustable in order to adjust to the location in which detection will occur. In one embodiment, the one or more targeting detector component includes a camera (such as, but not limited to, a thermal camera) in order to identify areas of interest (such as, but not limited to, temperature differences resulting from concealed material).

In one embodiment, the system of these teachings includes geolocation of the object of interest (the object being detected). In those embodiments, the system of these teachings includes a geolocation system and laser range finder. In one instance, the laser range finder uses the targeting electromagnetic radiation source in order to determine distance from the detector 50 to the object of interest.

FIG. 3c shows an embodiment of the analysis subsystem 55. Referring to FIG. 3c, in the embodiment shown therein, the analysis subsystem 55 includes a background subtraction subcomponent 60, a normalizing subcomponent 65, a ratio intensity subcomponent 70 and a projection subcomponent 75. The background subtraction subcomponent 60 is configured for subtracting a background value from a value for detected reflected/scattered electromagnetic radiation, the background subtraction subcomponent producing a background subtracted value. The normalizing subcomponent 65 is configured to normalize the background subtracted value with respect to a difference between a value for a measure of emission from the electromagnetic radiation source used to generate the image and a measure of background electromagnetic radiation. The ratio intensity subcomponent 70 is configured for obtaining a number of ratio values, each ratio value being a ratio of a background subtracted normalized value at one wavelength from the number of wavelengths to a background subtracted normalize value at a selected wavelengths from the number of wavelengths. The projection subcomponent 75 is configured for obtaining a measure of a portion of the number of ratio values located along predetermined values at the number of wavelengths for said predetermined materials (which is equivalent to the definition of a projection).

In one instance, the system of these teachings also includes an electromagnetic emission monitoring component. The timing component provides the initiation signal for initiating monitoring, using the monitoring component, of electromagnetic emission from the selected one of the electromagnetic radiation sources.

In one embodiment, emission substantially from one location for the electromagnetic radiation sources is enabled by means of an optical subsystem. In one instance, the optical subsystem has fiber optic pigtails optically coupled to each electromagnetic radiation source and an optical combiner receiving radiation from the fiber optic pigtails. In another instance, the optical subsystem includes one or more dichroic beam splitters, each dichroic beam splitter receiving electromagnetic radiation from one or more of electromagnetic radiation sources and an optical fiber receiving electromagnetic radiation from the one or more dichroic beam splitters.

In one embodiment, the analysis component includes one or more processors and one or more computer usable media having computer readable code embodied therein, the computer readable code causing the one or more processors to subtract a background value from a value for detected reflected/scattered electromagnetic radiation, subtraction producing a background subtracted value, obtain a number of ratio values, each ratio value being a ratio of a background subtracted value at one wavelength to a background subtracted value at a selected wavelength from the number of wavelengths and obtain a measure of a portion of the number of ratio values located along predetermined values at the number of wavelengths for the predetermined materials.

In one instance, the computer readable code also causes the one or more processors to normalize the background subtracted value with respect to a difference between a value for a measure of emission from one of the electromagnetic radiation sources and a measure of background electromagnetic radiation.

FIG. 3d shows an embodiment of the analysis component 55. Referring to FIG. 3d, in the embodiment shown therein, one or more processors 120 are operatively connected to a component 110 allowing receiving input from the detector 50 and to computer usable media 130 having computer readable code embodied therein, where the computer readable code causes the one or more processors to implement the method of these teachings for detecting concealed objects. In one instance, the one or more processors 120 are operatively connected by means of a computer connection component (such as a computer bus) 135.

In one embodiment, the subcomponents of FIG. 3c are configured for performing their specific function by the computer readable code, embodied in the computer usable media 130, causing the one or more processors 120 to perform the specific function.

Figure 8:
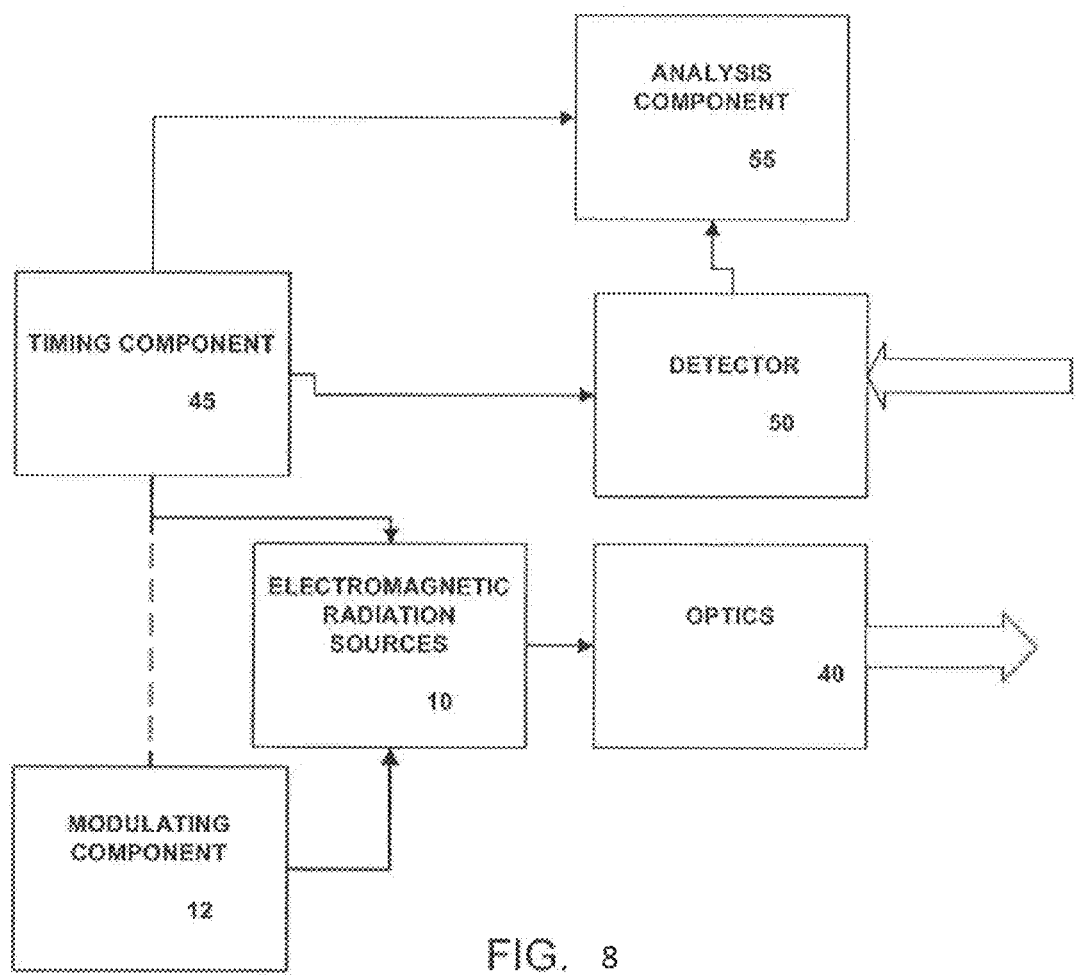
FIG. 8 shows a block diagram representation of another embodiment of the system of these teachings.

In another embodiment, the system of these teachings includes a modulating component that modulates, with respect to time, the emission of each electromagnetic radiation source. The modulated emission has time varying and DC component. FIG. 11 shows a block diagram representation of the embodiments including a modulating component. As shown in FIG. 8, the modulating component 12 is operatively connected to the electromagnetic radiation source in order to produce a modulated electromagnetic radiation emission. The block diagram representation shown in FIG. 8 is not meant to limit the configuration of the modulating component 12 with respect to the electromagnetic radiation sources 10.

Figure 9A:
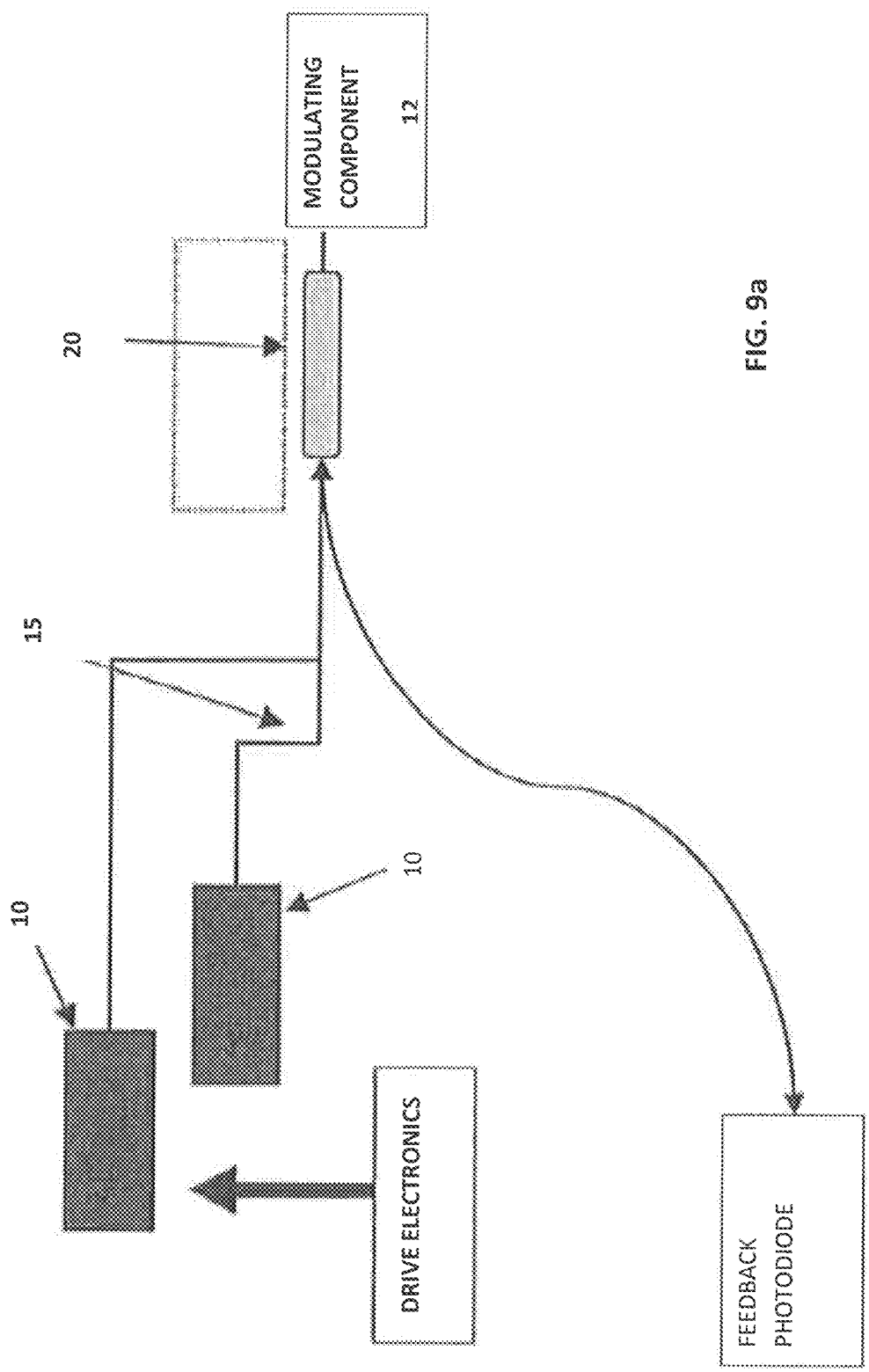
FIGS. 9a-9c show a portion of further embodiments of the system of these teachings.
Figure 9B:
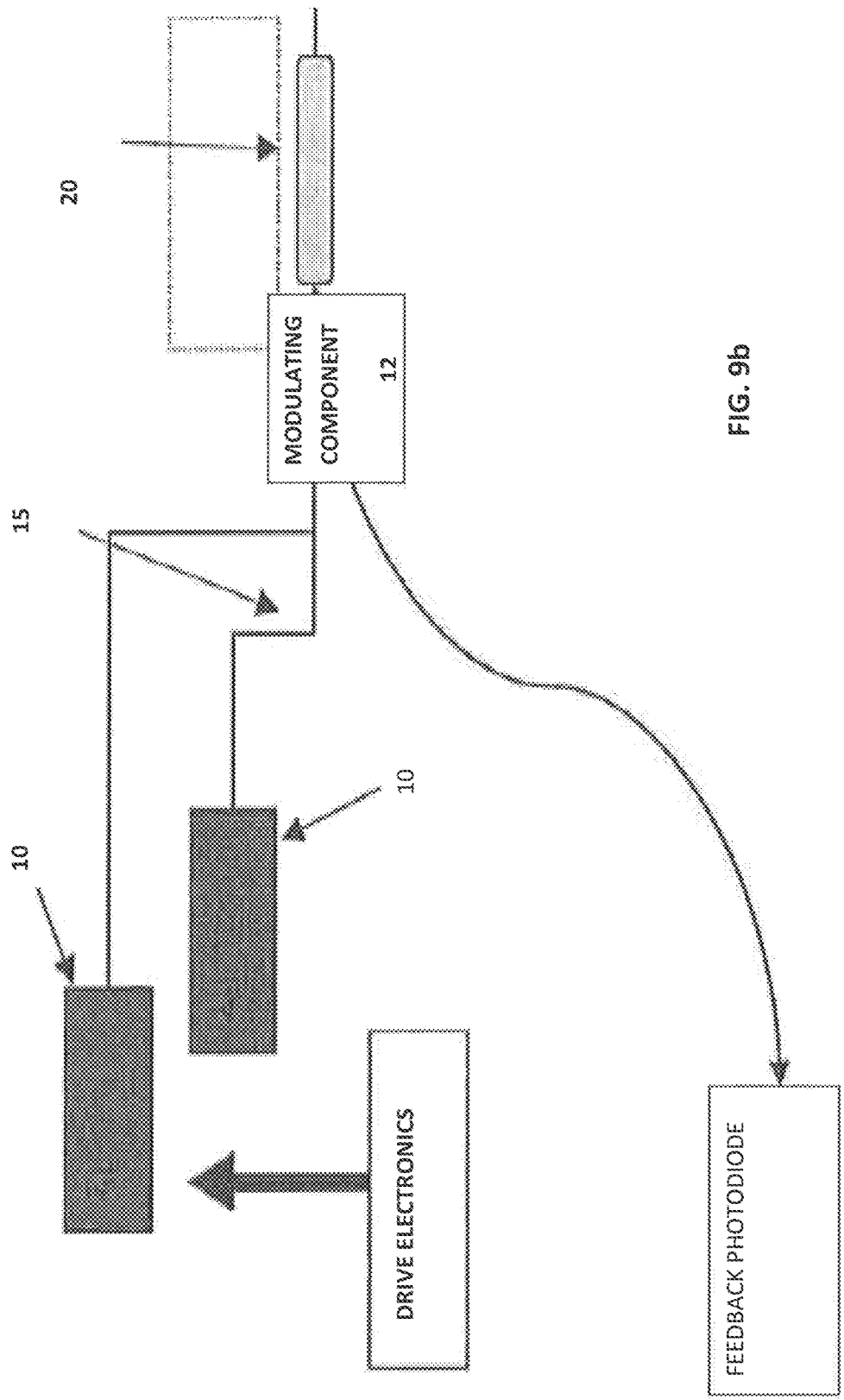
Figure 9C:
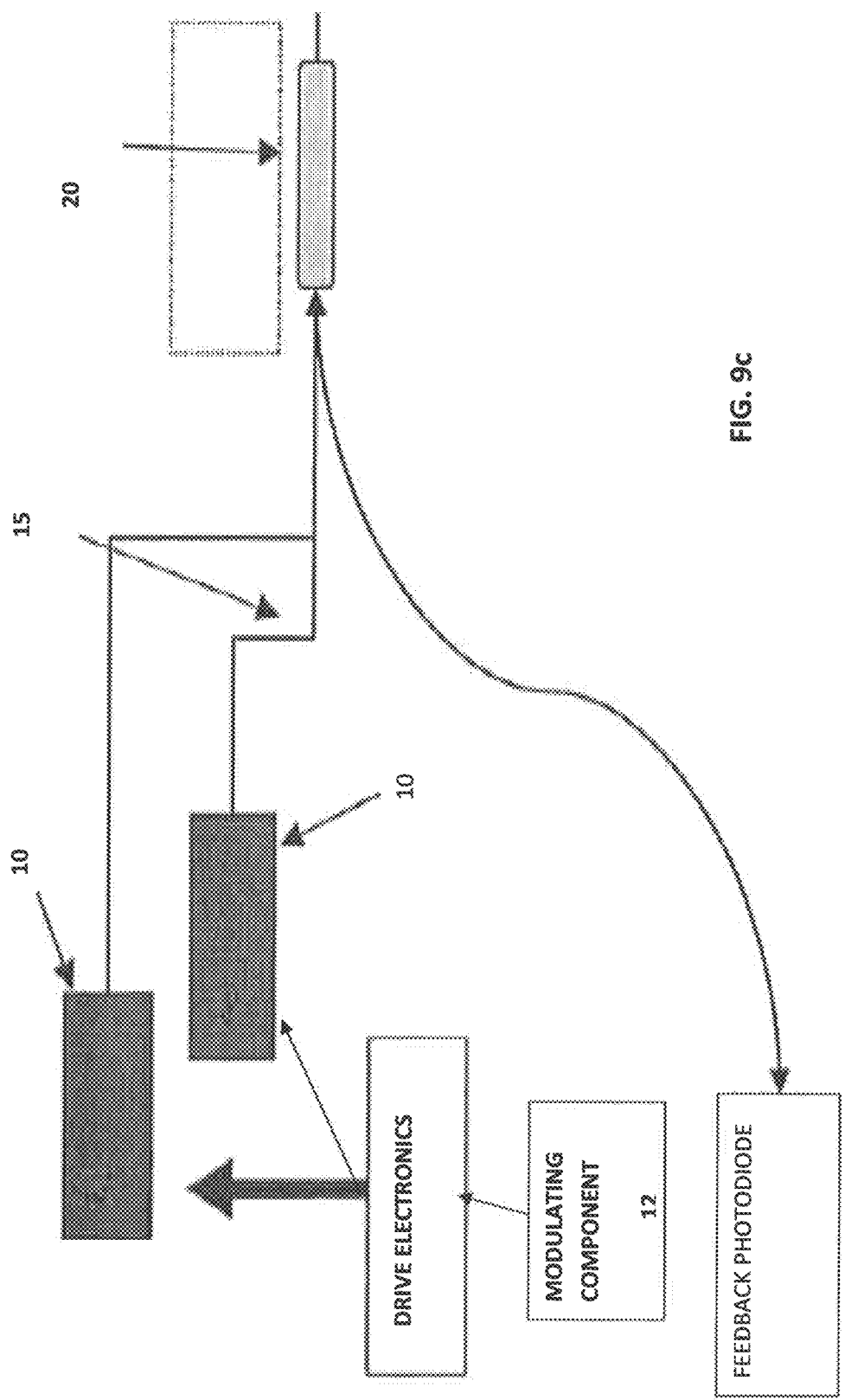

FIGS. 9a-9c show different configurations of the electromagnetic radiation sources 10 and the modulating component 12. It should be noted that these teachings are not limited to only the embodiments shown in FIGS. 9a-9c. In the embodiment shown in FIG. 9a, the modulating component is located after the beam combiner 20. In the embodiment shown in FIG. 12b, the modulating component 12 is located before the beam combiner 20. Some exemplary embodiments, these teachings not being limited only to the exemplary embodiments, of the modulating component 12 such as that used in FIGS. 9a and 9b are mechanical devices, such as a chopper wheel (a chopper wheel, in one instance is similar to the filter wheel in U.S. Pat. No. 7,328,060, Incorporated by reference herein is entirety and for all purposes, where some of the filters are clear and other filters are completely opaque), electro-optic modulators (for example, the modulators described in U.S. Pat. Nos. 6,330,097, 3,719,414, 3,429,636, in Yariv, Optical Electronics, 3rd edition, pp. 274-306, ISBN 0-03-070289-5, 1985 and in Hetch, Optics, pp. 314-321, ISBN 0-201-11609-X, 1974, all of which are Incorporated by reference herein in their entirety and for all purposes), and acousto-optic modulators (for example, those described in U.S. Pat. Nos. 4,759,613, 7,385,749, and in Yariv, Optical Electronics, 3rd edition, pp. 385-401, ISBN 0-03-070289-5, 1985, all of which are incorporated by reference herein in their entirety and for all purposes). The choice of modulator depends on availability, the type of electromagnetic radiation source used and the ease of providing multiple wavelengths. Embodiments in which the modulating component 12 is included in the laser cavity, for example in a Q switched laser, are also within the scope of these teachings.

FIG. 9c shows an embodiment in which the modulating component 12 is connected to or is a part of the drive electronics. Diode lasers can be modulated by modulating the drive current. (See, for example, these teachings not being limited only to these examples, U.S. Pat. Nos. 7,570,680, 5,651,017, 6,072,816, all of which are Incorporated by reference herein in their entirety and for all purposes).

In some instances, direct or indirect sunlight or incandescent light can introduce noise indeed detection process by producing signals of large magnitude. In embodiments in which the detecting component includes a photo detection subcomponent and an electronic readout subcomponent. The high ambient light contribution from direct or indirect sunlight or incandescent light can be countered by use of short image integration times in order to avoid saturation in the electronic readout subcomponent. However, the short integration times can present a limit to the amount of scattered light acquired during image capture. In one embodiment, the detecting component includes a photo detection subcomponent receiving the reflected/scattered electromagnetic radiation from the area of interest and providing an electrical signal and an electronic readout subcomponent receiving the electrical signal. The photo detection subcomponent is AC coupled to the electronic readout subcomponent. AC coupling can eliminate or greatly reduce the DC ambient light contribution from direct or indirect sunlight or incandescent light.

Figure 10:
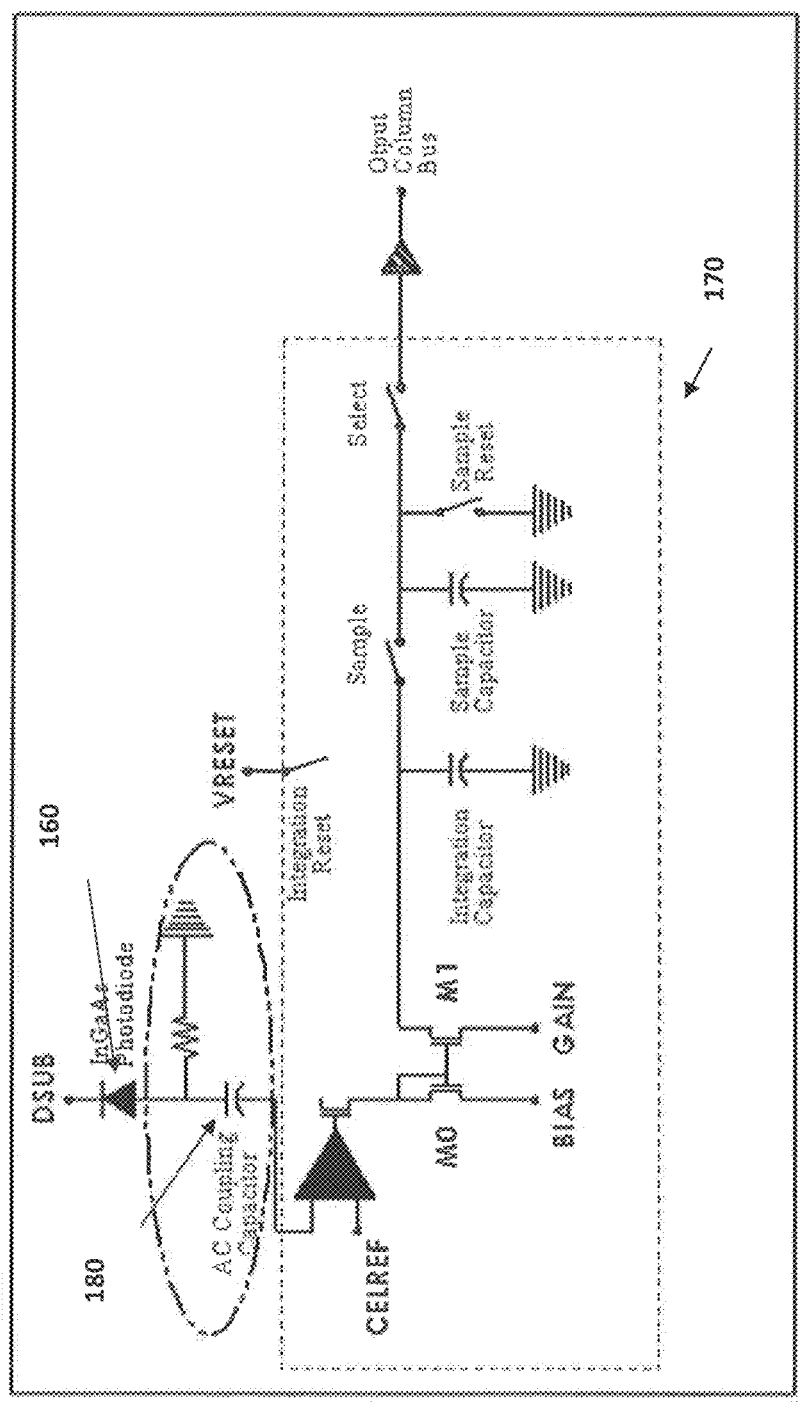
FIG. 10 shows the detecting component in one embodiment of the system of these teachings.

FIG. 10 shows an exemplary embodiment of a detecting component including a photo detection subcomponent 160 (a photo diode in the embodiment shown) providing an electrical signal after receiving electromagnetic radiation and an electronic readout subcomponent 170 receiving the electrical signal, where the photo detection subcomponent 160 is AC coupled, by means of a capacitor 180, to the electronic readout subcomponent 170.

In yet another embodiment, the system of these teachings includes a housing. In one instance, the housing has a top portion and a handle portion. The top portion has an opening at one end and a section extending away from that end. The detection component is disposed inside the house and optically disposed to receive reflected/scattered electromagnetic radiation from the area of interest through the opening. The electromagnetic radiation sources are optically disposed such that the electromagnetic radiation sources illuminate the area of interest through the opening. Weight and dimensions of the housing and components in the housing are selected to enable the housing to be handheld. The housing is operatively connected to the analysis component and to timing and power components. In one instance, the weight of the housing and components in the housing is less than 10 pounds, preferably less than 4 pounds.

Figure 6A:
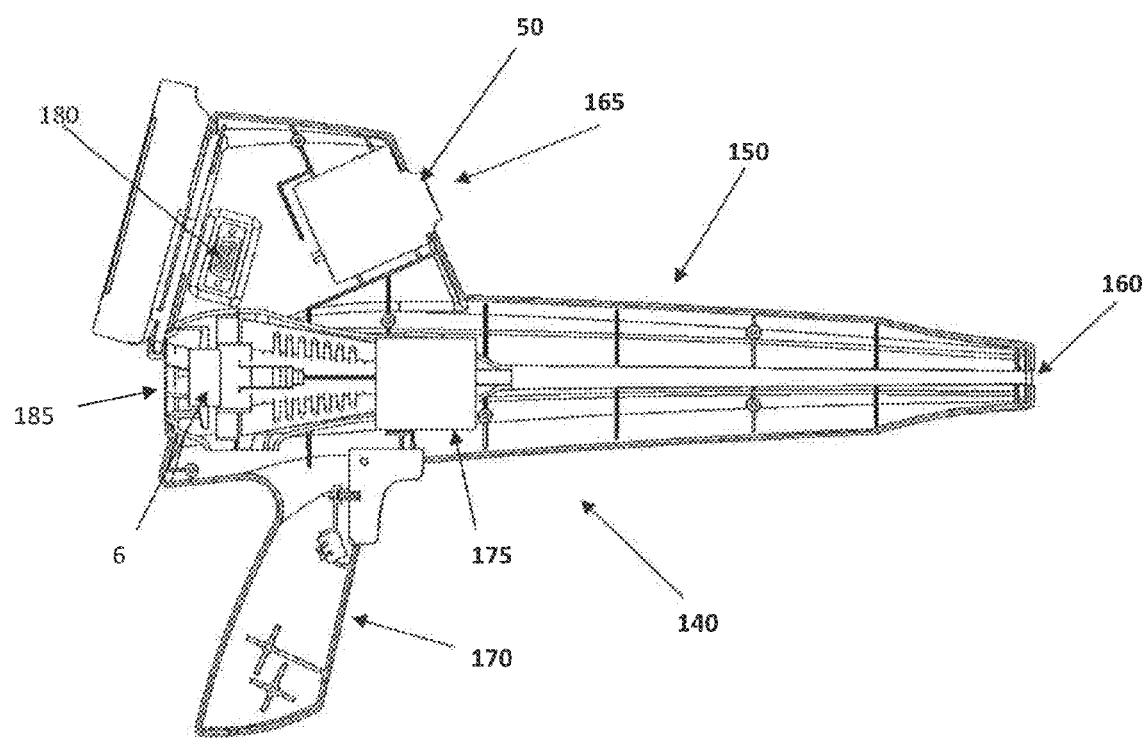
FIGS. 6a-6b show a portion of a portable embodiment of the system of these teachings.

FIG. 6a shows a portion of one embodiment of a portable system of these teachings including a housing. Referring to FIG. 6a, in the embodiment shown therein, the housing 140 has a top portion 150 and a handle portion 170. The top portion has an opening 160 at one end and a section extending away from that end. The detector 50 is disposed in that housing and optically disposed to receive, either through opening 160 and optic components 175 or through another opening 165, the scattered/reflected electromagnetic radiation from the area of interest. The electromagnetic radiation sources are optically disposed, either by being this post in the housing 140, as a component 6, or by being optically connected by an optical connection 185 to the housing 140, such that the electromagnetic radiation sources illuminate the area of interest through the opening. The data and timing signals can be exchanged through an electrical connector 180. A similar connector provides power signals.

Figure 6B:
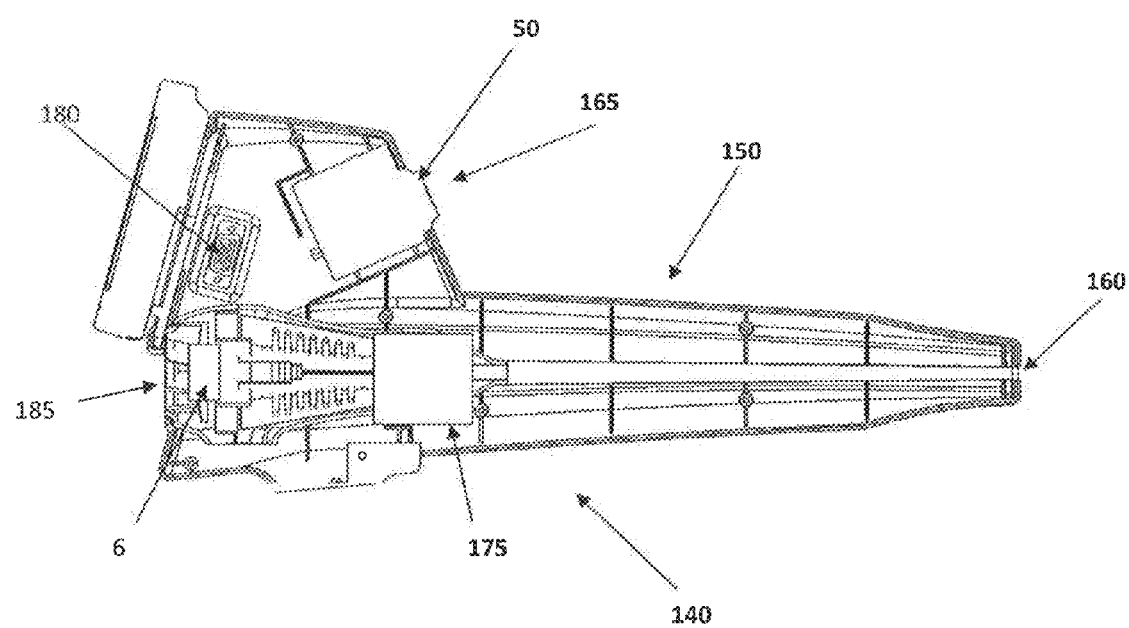

FIG. 6b shows another embodiment of the housing 140. In the embodiment shown in FIG. 6b, the handle portion is embodied in the top portion 150.

The electromagnetic radiation sources 10 used in the embodiments of the system of these teachings can be any of a wide range of electromagnetic radiation sources, such as, but not limited to, light emitting diodes, lasers, laser diodes and other electromagnetic radiation sources. The choice of wavelengths in embodiments of the system of these teachings is determined by an expeditious and efficient system design based on considerations such as what components are best suited for the application, availability of components and, in some cases, cost of components. There is no inherent limitation as to the choice of wavelengths in the embodiments of the system of these teachings.

In order to better illustrate the present teachings, an exemplary embodiment is disclosed hereinbelow. It should be noted that these teachings are not limited to this exemplary embodiment and that numerical values presented are presented for illustration purposes and not in order to limit the present teachings.

It should be noted that these teachings are not limited to the choice of electromagnetic radiation sources, wavelengths and detecting component used in the exemplary embodiment.

Although the exemplary embodiment shown hereinbelow relates to detecting explosives, it should be noted that other materials are also within the scope of these teachings.

Figure 2:
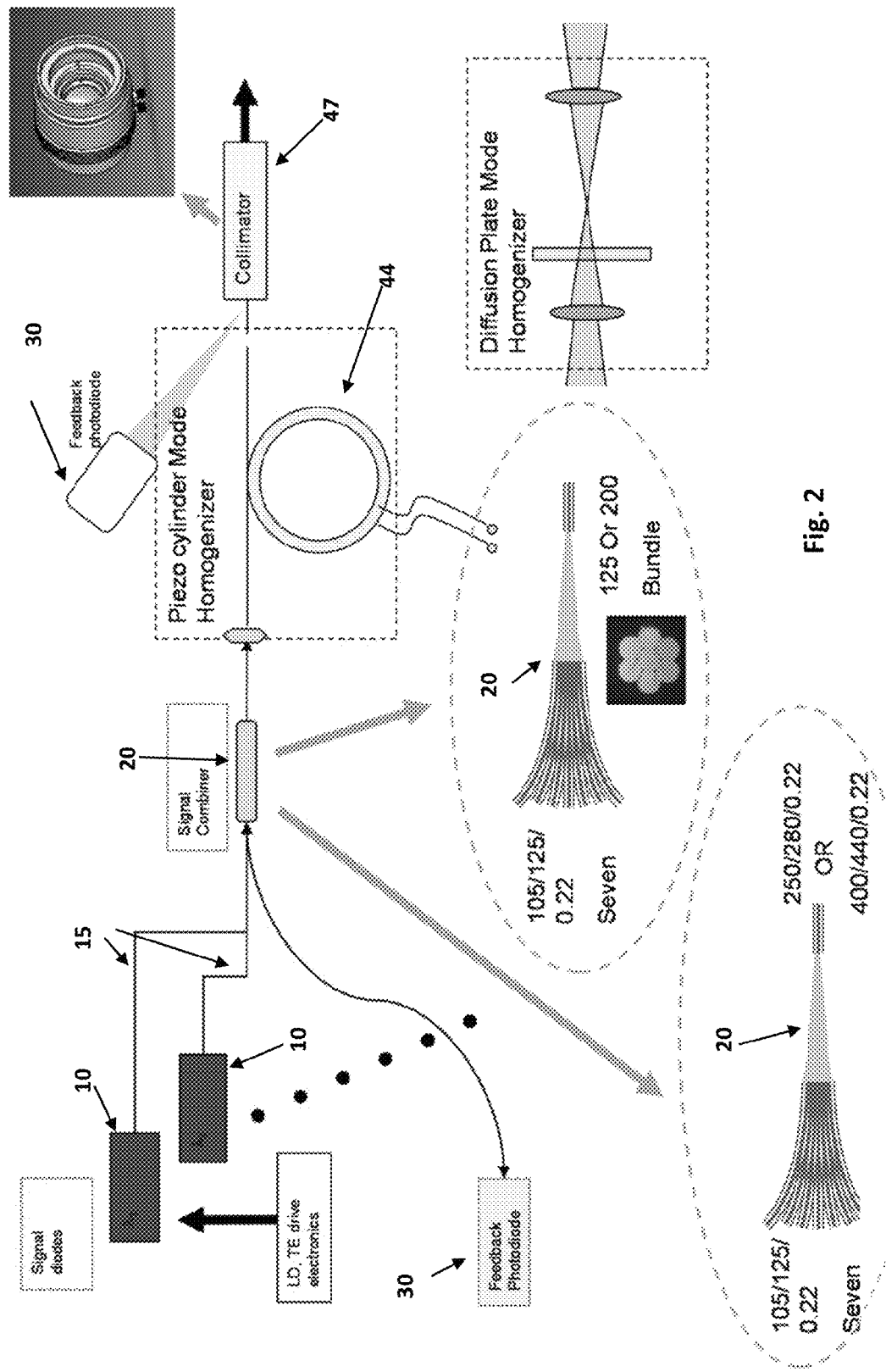
FIG. 2 shows an embodiment of the system of these teachings.

The exemplary embodiment of the system of these teachings includes a photodetector (an example of a detecting component or image acquisition component, detection optics being necessary in some instances), an InGaAs photodetector in the exemplary embodiment, a set of laser sources (an example of electromagnetic radiation sources), laser diodes in the exemplary embodiment, that are used to illuminate the area under surveillance, and a reference photodetector that monitors the level of laser light launched by the source. In the exemplary embodiment, each laser diode has substantially a different emission wavelength within the spectral range about 0.9 to about 2 micron. The number of laser diodes can vary from 2 to 10 depending on the level of spectral identification required. The lasers are fired sequentially so that the illuminated area is bathed in light of only substantially one wavelength at a time. (in one embodiment, the lasers are fired simultaneously and the multi wavelength detected signal decomposed into components at each wavelength using spectral decomposition tools—such as, for example, FFT.) The individual laser diode signals are made to emit from substantially a common location to control the uniformity of illumination in the area under surveillance. This can be accomplished, in one instance, these teachings not be limited to only that instance, using fiber optic pigtailed laser diodes and a fiber optic combiner or, in another instance, constructing a laser module in which the laser diode beams all fed into a single fiber optic using a series of dichroic beamsplitters. One embodiment of the components of the system of these teachings that ensure that individual laser diodes emit from substantially one location is shown in FIG. 2. Referring to FIG. 2, in the exemplary embodiment shown therein, laser diodes (electromagnetic radiation sources) 10 are optically connected to optical components 15, fiber-optic pigtails, in one embodiment, that provide the emitted electromagnetic radiation to a combiner component 20. A mode homogenizer 44 and a collimator 47 are subcomponents in the optical subsystem 40. A feedback photodiode (radiation monitoring component) 30 can detect the electromagnetic radiation provided by the collimator 47 or, in another embodiment, can detect the electromagnetic radiation provided to the combiner 20.

A block diagram representation of the exemplary embodiment of the system of these teachings is shown in FIG. 6b. Referring to FIG. 3b, in the exemplary embodiment shown therein, laser diodes 10 provide electromagnetic radiation through fiber pigtails 15 to a laser combiner 20. Electromagnetic radiation provided to the laser combiner 20 is monitored by the photodiode 30. The electromagnetic radiation provided by one laser diode 10 is delivered through the optical component 40 to area of interest. The optical component 40 includes a mode homogenizer 44 and a collimator 47. The electromagnetic radiation scattered/reflected from the area of interest is collected by the detection component 50 (including a photodiode in the exemplary embodiment). The data is provided to the analysis component 55.

Figure 4:
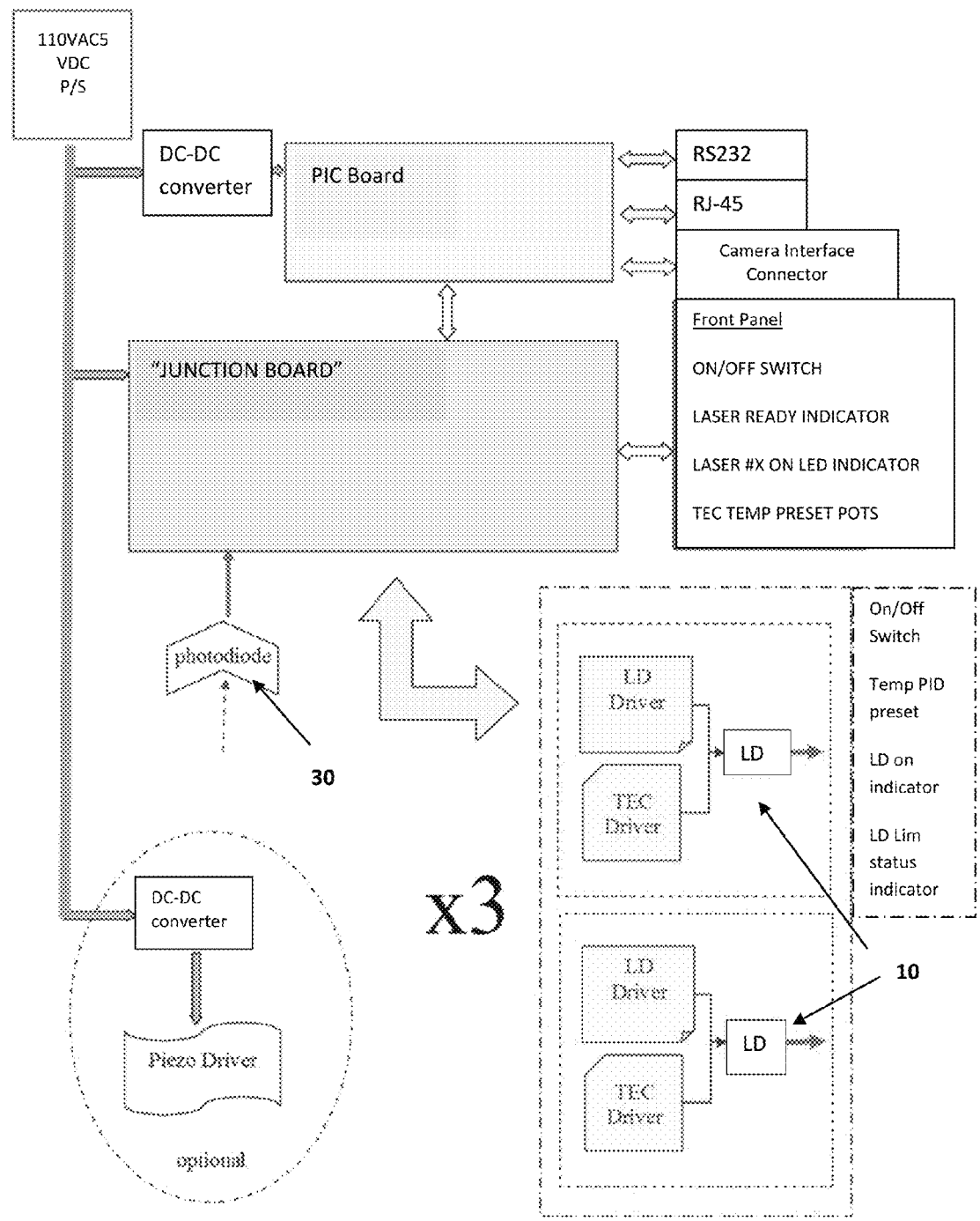
FIG. 4 shows a high-level block diagram of the electronics in the exemplary embodiment.

An electronic trigger signal is used to trigger the laser diodes. A high-level block diagram of the electronics in the exemplary embodiment is shown in FIG. 4. The same trigger signal is also used to trigger the capture of a value with the detector and the capture of a reference photodetector 30 reading of the laser's launched power.

Each value is, in one instance, not a limitation of these teachings, a 14 bit reading from the detector. A background value may also be collected to correct for any ambient light contribution to the acquired image. The reference photodetector signal is also digitized and stored along with the data array for that particular laser's image.

The data collected at each of the different wavelengths is treated as an array of numbers throughout the data processing steps used to generate the final result. The data processing steps are performed on across the collected detector outputs. This means that an operation like background subtraction is performed by subtracting a given value from the background value from the corresponding detector output collected with the laser firing. Any operation generates a new array which contains the same number of elements as the array on which it was performed.

The laser wavelengths are selected so that a few of them coincide with regions of the spectrum where the material of interest, in one instance, explosives of interest, absorb electromagnetic radiation and others where the explosives have minimal absorption. Image data collected with the lasers having wavelengths where little to no absorption is observed are used to correct for the distance dependence of reflected light intensity (i.e., for non collimated light intensity drops off in proportion to $1/r^2$ where r is the distance from the light source).

Figure 7A:
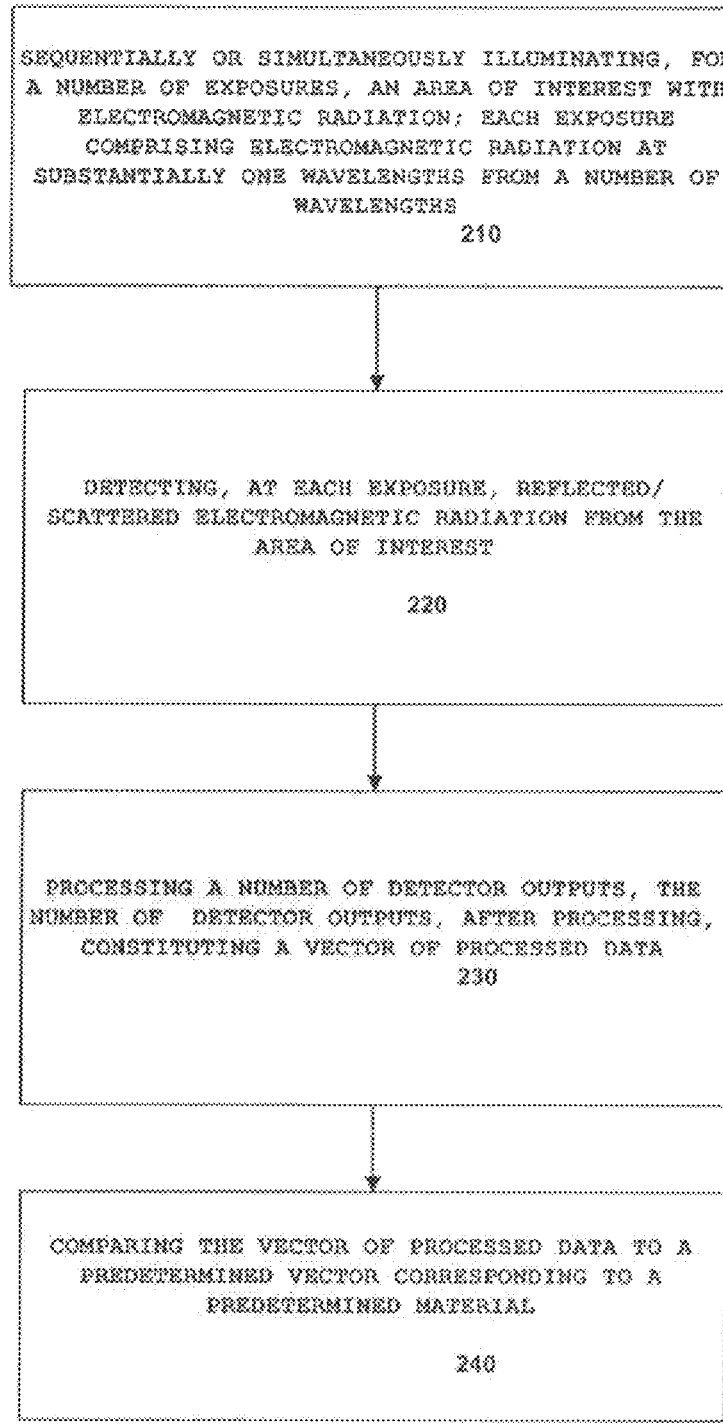
FIGS. 7a and 7b show embodiments of the method of these teachings.

An embodiment of the method of these teachings is shown in FIG. 7*a*. In the embodiment shown in FIG. 7*a*, the method of these teachings includes sequentially or simultaneously illuminating, for a number of exposures, an area of interest with electromagnetic radiation, each exposure comprising electromagnetic radiation at substantially one wavelengths from a number of wavelengths (step 210, FIG. 7*a*), at least some of the number of wavelengths substantially coinciding with wavelengths in an absorption spectrum of predetermined materials, at least some exposures from the number of exposures being at different wavelengths. At each exposure, reflected/scattered electromagnetic radiation from the area of interest is detected (step 220, FIG. 7*a*). A number of detector outputs are processed (step 230, FIG. 7*a*), the number of detector outputs being obtained by the sequentially illuminating. The number of detector outputs, after processing, constitutes a vector of processed data. The vector of processed data is compared to a predetermined vector corresponding to a predetermined material (step 240, FIG. 7*a*), presence of the predetermined material being determined by the comparison.

Figure 7B:
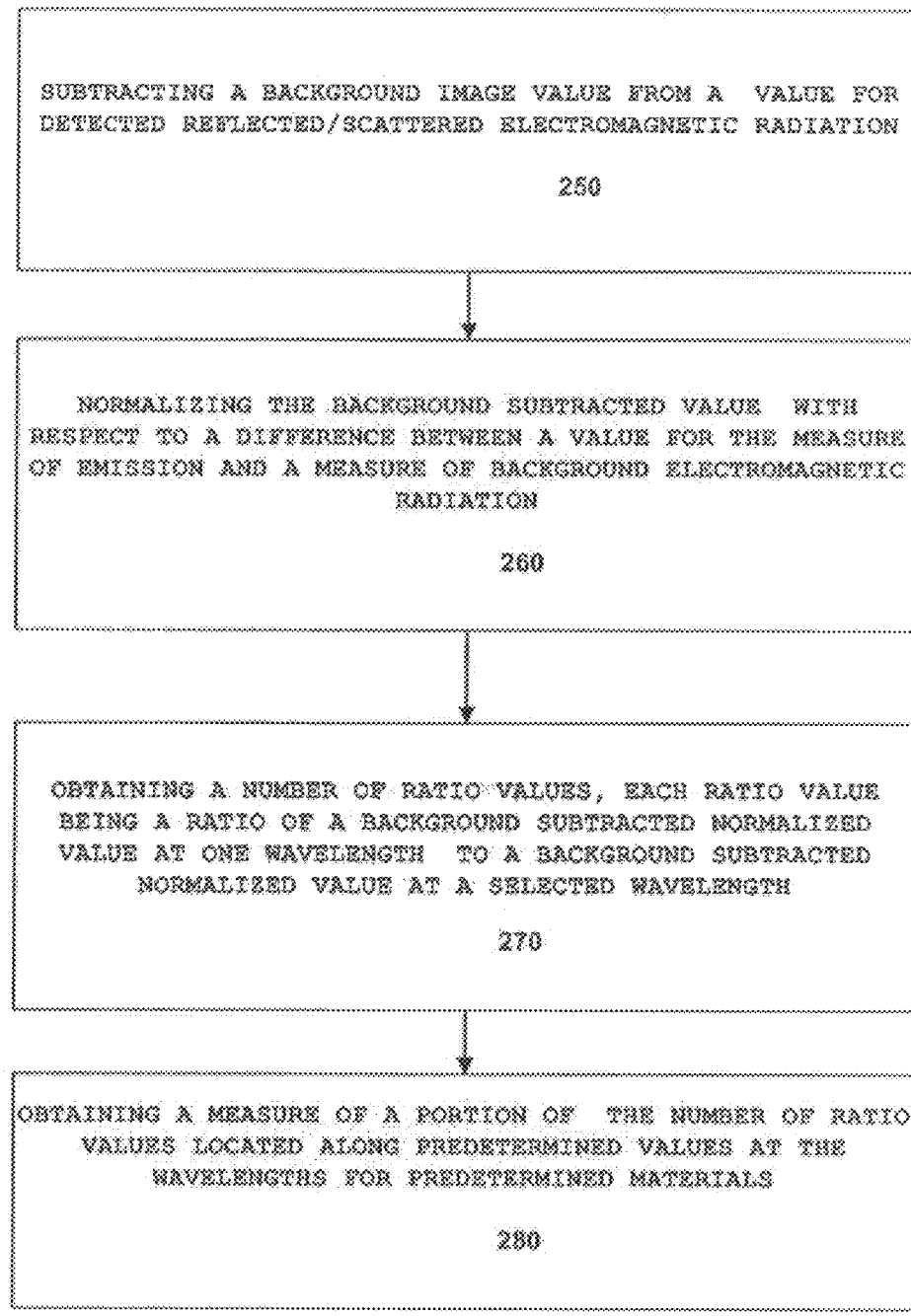

One embodiment of the processing and comparing steps is shown in FIG. 7*b*. In the embodiment shown in FIG. 10*b*, the processing and comparing steps include subtracting a background value from a value for detected reflected/scattered electromagnetic radiation (step 250, FIG. 7*b*), the subtraction producing a background subtracted value. The background subtracted value is normalized with respect to a difference between a value for the measure of emission and a measure of background electromagnetic radiation (step 260, FIG. 7*b*). A number of ratio values are obtained (step 270, FIG. 7*b*), each ratio value being a ratio of a background subtracted normalized value at one wavelength from the number of wavelengths to a background subtracted normalized value at a selected wavelengths from the number of wavelengths. A measure of a portion of the number of ratio values located along predetermined values at the number of wavelengths for predetermined materials is obtained (the measure is a result of the projection of the vector of processed data onto the predetermined vector corresponding to a predetermined material), a presence of the predetermined materials being ascertainable from that measure.

In one instance, the steps of sequentially illuminating and detecting are performed using a handheld device. In one embodiment, sequentially illuminating and detecting are performed while scanning the area of interest with the handheld device. In another embodiment, sequentially illuminating and detecting are performed in a point-and-shoot manner.

The following describes one exemplary embodiment of the data processing steps taken to generate differential or ratio images and finally a multidimensional vector that can be used to distinguish the presence of materials, explosives in one embodiment, based on their unique optical absorption patterns.

It should be noted that other embodiments are within the scope of these teachings.

Data Processing

Data processing is used to identify those areas of the images where wavelength specific attenuation has occurred due to the presence of an explosive. This processing treats the detector outputs as a data array and operates on the individual elements of the arrays to generate new arrays.

Step 1 Background Subtraction

The first step in data processing involves subtraction of background ambient light. This step involves subtracting the value in the background image from the corresponding detector value. The result is a new image array for each wavelength wherein the values are proportional to only the laser light being reflected back to the detector.

Step 2 Normalization for Laser Launch Energy

The output power of the laser diodes is only moderately controlled. Rather than providing a strict control over the actual power launched we simply measure the launch power at the end of the combiner fiber optic than normalize each background corrected image for the launch level of the laser with which the image was collected. Normalization involves dividing each element of the background corrected array with the signal value collected from the system's reference photodetector. The result is a new array with each element of the array normalized to the laser output power.

Step 3 Calculating Differential or Ratio Intensity Image Data

The presence of an explosive in the area under surveillance would result in differences in the image data collected with laser wavelengths that coincide with absorption bands versus those that do not. Two simple ways to see these differences is to generate differential or ratio images. A differential image can be generated by subtracting the value from the corresponding values under illumination at a different wavelength. Alternatively, a ratio image can be generated by calculating the quotient of the values for detector output and the corresponding values from a second detector output taken at a different wavelength.

Step 4 Vector Treatment and Analysis of Image Data

Differential or ratio images can be generated using any unique combination of wavelength images collected by the system. The individual values within the multiple image data sets generated by these treatments can be used to produce a single vector representation of the complete set of detector outputs. The vector is calculated by treating each differential or ratio value as a dimension in an n-dimensional space wherein "n" is the total number of unique difference or ratio images. The projection of the vector along each dimension is defined by the value within the differential or ratio image data set. For example, assume the system is using three (3) wavelengths so there are three (3) unique ratio image data sets ($\frac{1}{2}$, $\frac{1}{3}$, and $\frac{2}{3}$). A 3-dimensional vector representation of any element within the three arrays can be then generated by setting the projection along each orthogonal dimension equal to the value of the element in the respective array (see, for example, FIG. 1). In other words, if you just look at value and treat the ratio $\frac{1}{2}$ as the x-axis in a 3-dimensional (XYZ) space the value of X in our 3-dimensional space would be equal to that value in the $\frac{1}{2}$ image data set. We could similarly set the value in the $\frac{1}{3}$ image data set as the projection along the y-axis and the same value in the $\frac{2}{3}$ image data set as the projection along the z-axis. The data could then be defined as the vector—$(X_{1/2}, Y_{1/3}, Z_{2/3})$ wherein the magnitude of the vector is with respect to the origin. This same calculation can be run on the data sets for as many unique combinations of wavelengths as the user wishes. In some cases it is better to not use all the possible permutations, but only a select subset. The selection of an optimal set of combinations requires experimentation with the spectral characteristics of the explosives of interest and spectrum from different potential interfering agents.

The vector that is formed by the spectral results of differential or ratio imaging can then be used to determine if an unknown set of images contains any of the explosives of interest or not by comparing the vectors. This process looks at the projection of the unknown image data vectors onto the known explosives vectors. This comparison can look at the direction and magnitude or just direction. The direction is relative to the known explosives vectors (angle between the two vectors). This is easily calculated using the expression:

$$\theta = \arccos\left(\frac{k \cdot u}{\|k\|\|u\|}\right),$$

where k·u is the dot product of the known explosive and unknown vectors and $\|v\|$ denotes the magnitude of the vectors (square root sum of the squares for all the dimensions). (The "metric" can also be defined, in some embodiments, as simply the value of cos (θ), he two definitions being substantially the same for small angles.) The result will only be zero (or nearly zero) when the two vectors have the same direction (i.e., the two vector are from the same type of material).

An alternative treatment of the image data is to digitize it by setting a threshold value above which the differential or ratio is set equal to 1 and below which it is set equal to 0. Differential or ratio image data sets can be analyzed in much the same way as the non digitized data sets.

In one embodiment of the system of these teachings, the system includes one or more processors and one or more computer usable media that has computer readable code embodied therein, the computer readable code causing the one or more processors to execute at least a portion of the method of these teachings. The one or more processors and the one or more computer usable media are operatively connected.

Figure 5:
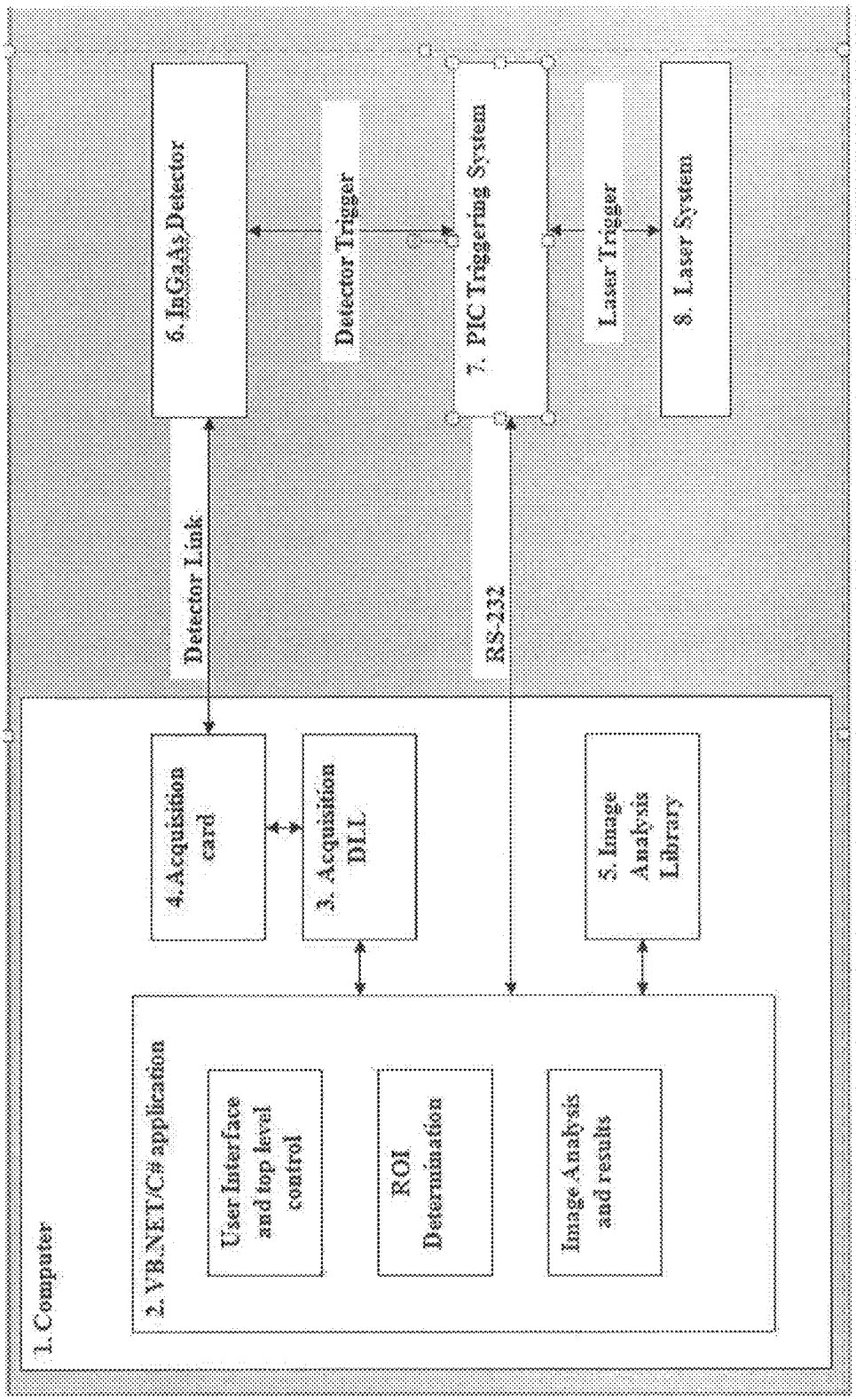
FIG. 5 shows an electrical and software block diagram of the exemplary embodiment.

An electrical and software block diagram of the exemplary embodiment is shown in FIG. 5. Referring to FIG. 5, in the embodiment shown there in, a timing component 45, PIC triggering system, provides the timing initiation signal (trigger) to the electromagnetic radiation source 10, a laser system, to the detection system 50, an InGaAs detector, and to the analysis subsystem 55. The detection system 50 provides the data to the analysis subsystem 55 by means of an input component 110, an acquisition card, which communicates with the analysis subsystem 55 by means of an acquisition DLL. An image analysis library 115 provides, in one embodiment, the predetermined vector corresponding to a predetermined material to the analysis subsystem 55.

Step 5 Presenting Results

In order to further better illustrate the present teachings, an exemplary embodiment of the data processing is disclosed hereinbelow.

The purpose of the process is to remove the ambient light effect and help to detect the materials, explosives in the exemplary embodiment. The example includes four (4) lasers from which three (3) ratio images are generated. A graphic showing how a vector is constructed in three-dimensional space from the projection of X, Y, and Z components is also provided in FIG. 1. This graphic shows a simulated vector for an explosive (Ve) and a simulated vector for an unknown compound (Vu) having a sizeable angular difference between them.

Data Processing Method

1. Normalize with Photo Diode Reading

For each detector value, normalization is done using Equation 1, $$\alpha_i = \frac{L_i - BK}{PIN_i - PIN_{BK}} i = 1, \ldots, 6 \qquad (1)$$

where $L_i$ is the detector value, BK is the background value, $PIN_i$ and $PIN_{BK}$ are photo diode reading for laser and background, respectively. Here background value is the value acquired when no laser diode is turned on. The purpose of background image is to remove the effect of ambient light.

2 Get the Ratios

After normalization in 2.1, N normalized values can averaged to obtain $\bar{a}_i$. The ratio images are computed using Equation 2.

$$r_j = \frac{\overline{\alpha_i}}{\overline{\alpha_k}} j = 1, \ldots, 4 \ i, k \in [1, \ldots, 6] \qquad (2)$$

3 Find the Dynamic Ranges

For the ratios obtained in 2.1, the dynamic range is broad. To control the dynamic range to exclude outliers, the ratio values are assumed to be close to Gaussian distribution. The mean $\overline{r}_j$ and standard deviation $\sigma_j$ of the ratio image are computed. Through experiments, $[r_j - 1.5 \ast \sigma_j, r_j + 1.5 \ast \sigma_j]$ is chosen as the dynamic range. The benefit is that this dynamic range is computed automatically from the ratio image itself and can adapt to the lighting changes.

4 Vectors from Multiple Laser Ratio

To fuse the information from individual ratio, we propose to form a vector feature from multiple ratios, as shown in equation (4).

$$v = (r_i, r_j, r_k) \ i,j,k \in [1, \ldots, 4] \qquad (4)$$

In such a way, the individual ratio becomes the component of the vector. Such a vector combines the information from multiple lasers and will have stronger detection capability than single ratio. An example vector given in equation (4) is shown in FIG. 4, where $V_e$ is the vector from explosive region and $V_u$ is from other regions. There is an angle θ between the two vectors.

The principle for the vector based detection is: each individual ratio will generate values different for regions with and without explosive pouches. Therefore, the vectors composed of these ratios in explosive region will point to some specified direction with certain magnitude, while vectors without explosive pouches will point to some uncertain directions and magnitude. In such way, the region with explosive pouches will be detected.

In order to further elucidate these teachings, another exemplary embodiment is presented herein below. It should be noted that these teachings are not limited only to the exemplary embodiments.

An exemplary embodiment is a system for stand-off detection of explosives based on spectral analysis of a Short-Wave InfraRed (SWIR) backscattered light. Detection is accomplished by illuminating a subject while simultaneously collecting and measuring a portion of the backscattered signal using an AC coupled photodetector/amplifier circuit. Illumination is accomplished with a set of intensity modulated laser diodes which fire simultaneously, but are modulated at different, non-harmonic frequencies. Each diode is selected to emit within a set of wavelengths that coincide with a known region of the SWIR spectrum where explosives exhibit unique optical absorption features, but other materials including cloth do not thus enabling detection of explosives concealed on a person. The diode wavelengths are further selected to include multiple wavelengths that are resonant with the absorption bands of the explosives and at least one wavelength that is not resonant. The non resonant wavelength is used to correct for the effect of distance on the observed signal strengths of the resonant wavelengths. The AC coupled amplifier circuit is used to eliminate DC and low frequency noise contributors such as sunlight and/or other ambient light sources.

Detection of the backscattered "sensing" signal is achieved using a SWIR sensitive photodetector such as an InGaAs photodiode. A second "reference" photodetector is used to monitor the launched laser diode signals to generate readings that can be used to correct for variations in laser diode output. Detection begins by simultaneously collecting a brief period (typically 1 millisecond) of digitized readings from both the "sensing" and "reference" AC coupled photodetectors. The individual laser diode signals are extracted from the two data sets using a Discrete Fourier Transform (DFT) algorithm. DFT algorithms and their use in extracting frequency-dependent signal magnitudes from observed waveforms is well-known. The signal magnitudes of the individual laser diode contributions to the backscattered signal are then normalized using the individual "reference" signal magnitudes and finally processed to yield ratios of the normalized "sensing" resonant signals to the normalized non resonant "reference" signal. The resulting ratios are treated as scalars in an n-dimensional vector space wherein the direction of the vector uniquely defines the material observed. The methods for determining the presence and type of explosive based on the solid angle (cos theta) between the observed vector and the known vectors for explosives are disclosed herein above.

Because of the inability to image with the single "sensing" photodiode, the system includes a secondary targeting capability that will identify the location at which detection will occur. Targeting, in one instance, involves delivering a shorter wavelength laser signal through the "sensing" photodetector's collection optics while monitoring the location of the beam on the subject using an imaging system such as a silicon-based camera or night vision goggles or a cross-haired sight. The targeting laser wavelength would preferably be beyond the range of detection by the human eye, but readily visible by the imaging system. To avoid corruption of the "sensing" process, the targeting laser 1) uses a wavelength that is undetected by the SWIR detectors or 2) only operates when the sensing laser diodes are not in use or 3) is operated in a DC mode making it essentially invisible to the AC coupled detector. Co-alignment of the targeting laser beam and principal detector optical axis, in one instance, is achieved using a long-pass dichroic beamsplitter. In that instance, the dichroic beamsplitter provides one beam, in one range of wavelengths (or frequencies) to the detector and another beam, which can be rendered substantially parallel or aligned to the first beam, to the targeting component (such as, for example, a silicon-based camera or night vision goggles or a cross-haired sight).

In one embodiment, an additional imaging capability is added to the system to assist with identifying concealed anomalies that would warrant further examination with the system's "sensing" feature. One example of such an additional imaging capability is a thermal camera which could identify anomalous areas from temperature differences resulting from non uniform heat transfer or build-up in the area of the concealed material.

In another embodiment, geolocation of the threat being detected is also implemented. This is realized by inclusion of a Geo Positioning System and laser range finder. The laser range finder, in one instance, uses the targeting laser for measuring the distance from the detector to the target.

While the above exemplary embodiment referred to the detection of explosives, these teaching are not limited only to detecting explosives and the method can be applied to other concealed materials.

For the purposes of describing and defining the present teachings, it is noted that the term "substantially" is utilized herein to represent the inherent degree of uncertainty that may be attributed to any quantitative comparison, value, measurement, or other representation. Phrases such as substantially simultaneously or substantially equal are exemplary of representations of the inherent degree of uncertainty that may be attributed to any quantitative comparison. The term "substantially" is also utilized herein to represent the degree by which a quantitative representation may vary from a stated reference without resulting in a change in the basic function of the subject matter at issue.

The detection method of the present teachings is preferably performed at some finite distance from the material being detected, which is referred to as the "standoff distance".

The standoff distance could be in the range of from 1 cm to 100 m. In all cases, the material being detected may be concealed under some type of covering materials such as cloth, paper, plastic, or leather that has substantial optical absorption and/or light scattering properties which obscures viewing the concealed material under the covering material with light in the visible wavelength range (400-700 nm).

Elements and components described herein may be further divided into additional components or joined together to form fewer components for performing the same functions.

Each computer program may be implemented in any programming language, such as assembly language, machine language, a high-level procedural programming language, or an object-oriented programming language. The programming language may be a compiled or interpreted programming language. Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, any physical medium with patterns of holes, a RAM, a PROM, and EPROM, a FLASH-EPROM, any other memory chip or cartridge, all of which are non-transitory. As stated in the USPTO 2005 Interim Guidelines for Examination of Patent Applications for Patent Subject Matter Eligibility, 1300 Off. Gaz. Pat. Office 142 (Nov. 22, 2005),"On the other hand, from a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal."

The following is a disclosure by way of example of a device configured to execute functions (hereinafter referred to as computing device) which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least include a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and or application specific integrated circuit ("ASIC") customized logic circuitry, such as a controller or microcontroller, a digital signal processor, or any other form of device that can fetch instructions, operate on pre-loaded/pre-programmed instructions, and/or followed instructions found in hard-wired or customized circuitry to carry out logic operations that, together, perform steps of and whole processes and functionalities as described in the present disclosure.

In this description, various functions, functionalities and/or operations may be described as being performed by or caused by software program code to simplify description. However, those skilled in the art will recognize what is meant by such expressions is that the functions result from execution of the program code/instructions by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metallization(s) interconnects of the base gate array ASIC architecture or selecting and providing metallization(s) interconnects between standard cell functional blocks included in a manufacturer's library of functional blocks, etc. Embodiments can thus be implemented using hardwired circuitry without program software code/instructions, or in combination with circuitry using programmed software code/instructions. A processor can be configured to perform tasks using hardwired circuitry without program software code/instructions, or in combination with circuitry using programmed software code/instructions or using software code embedded in any tangible computer-readable media.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory or external (to the microprocessor) memory such as main memory, or a disk drive or external to the computing device, such as a remote memory, a disc farm or other mass storage device, etc. Commercially available microprocessors, one or more of which could be a computing device or part of a computing device, include a PA-RISC series microprocessor from Hewlett-Packard Company, an 80×86 or Pentium series microprocessor from Intel Corporation, a PowerPC™ microprocessor from IBM, a Sparc™ microprocessor from Sun Microsystems, Inc., or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The interconnect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or 'other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instance of time.

In general, a tangible machine readable medium includes any tangible mechanism that provides (i.e., stores) information in a form accessible by a machine (i.e., a computing device, which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

Although these teachings has been described with respect to various embodiments, it should be realized these teachings is also capable of a wide variety of further and other embodiments within the spirit and scope of the claims.

The invention claimed is:

1. A system comprising:
   a non-pixelated detecting component detecting incident electromagnetic radiation;
   a number of electromagnetic radiation sources; each electromagnetic radiation source emitting at substantially one wavelength from a number of wavelengths; at least some of the number of wavelengths substantially coinciding with wavelengths in an absorption spectrum of predetermined materials; each one of the number of the electromagnetic radiation sources illuminating an area of interest; the number of electromagnetic radiation sources emitting substantially from one location; the non-pixelated detecting component receiving reflected/scattered electromagnetic radiation from the area of interest;
   a modulating component modulating, with respect to time, emission from said each one of the number of electromagnetic radiation sources; said each one of the number of electromagnetic radiation sources being modulated at a non-harmonic frequency different from a non-harmonic frequency at which another one of the number of electromagnetic radiation sources is modulated; and
   an analysis component configured to:
      process an output of the non-pixelated detecting component, the output of the non-pixelated detecting component being obtained, by illuminating an area of interest, in order to obtain data at each wavelength from a plurality of wavelengths; the output of the non-pixelated pixelated detecting component, after processing, constituting a vector of processed data at the plurality of wavelengths; and
      compare the vector of processed data to a predetermined vector corresponding to a predetermined or presence of the predetermined material being determined by comparing the vector of processed data to said predetermined vector.

2. The system of claim 1 wherein the non-pixelated detecting component comprises a photo-detection subcomponent receiving the reflected/scattered electromagnetic radiation from the area of interest and providing an electrical signal; and an electronic readout subcomponent receiving the electrical signal; the photo-detection subcomponent being AC coupled to the electronic readout subcomponent.

3. The system or claim 2 wherein the analysis component comprises:
   a background subtraction subcomponent configured for subtracting a background value from a value for detected reflected/scattered electromagnetic radiation; the background subtraction subcomponent producing a background subtracted value;
   a ratio intensity subcomponent configured for obtaining a number of ratio values, each ratio value being a ratio of a background subtracted value at one wavelength from the number of wavelengths to a background subtracted value at a selected wavelengths from the plurality of wavelengths; and
   a projection subcomponent configured for obtaining a measure of a portion of the number of ratio values located along predetermined values at the number of wavelengths for said predetermined materials;

a presence of said predetermined materials being ascertainable from said measure.

4. The system of claim 3 wherein the analysis component further comprises a normalizing component configured to normalize the background subtracted value with respect to a difference between a value for a measure of emission from one of the number of electromagnetic radiation sources and a measure of background electromagnetic radiation.

5. The system of claim 3 wherein said analysis component comprises:
at least one processor; and
at least one computer usable medium having computer readable code embodied therein, the computer readable code causing said at least one processor to:
subtract a background value from a value for detected reflected/scattered electromagnetic radiation; subtraction producing a background subtracted value;
obtain a number of ratio values, each ratio value being a ratio of a background subtracted value at one wavelength from the number of wavelengths to a background subtracted value at a selected wavelength from the plurality of wavelengths; and
obtain a measure of a portion of the number of ratio values located along predetermined values at the number of wavelengths for said predetermined materials;
said at least one processor and said at least one computer usable medium constituting the background subtraction subcomponent, the ratio intensity subcomponent and the projection subcomponent.

6. The system of claim 5 wherein the computer readable code further causes said at least one processor to:
normalize the background subtracted value with respect to a difference between a value for a measure of emission from one of the number of electromagnetic radiation sources and a measure of background electromagnetic radiation.

7. The system of claim 2 further comprising a timing component providing a signal for initiation of emission from a selected one of the number of electromagnetic radiation sources; the timing component also providing said initiation signal for initiating detection by the detecting component and for initiating analysis.

8. The system of claim 7 further comprising an electromagnetic emission monitoring component; wherein the timing component provides said initiation signal for initiating monitoring of electromagnetic emission from the selected one of the number of electromagnetic radiation sources.

9. The system of claim 2 wherein emission substantially from one location for the number of electromagnetic radiation sources is provided by use of an optical subsystem.

10. The system of claim 9 wherein the optical subsystem comprises fiber optic pigtails optically coupled to each electromagnetic radiation source from the number of electromagnetic radiation sources; and an optical combiner receiving radiation from the fiber optic pigtails.

11. The system of claim 9 wherein the optical subsystem comprises one or more dichroic beam splitters, each dichroic beam splitter receiving electromagnetic radiation from one or more of the number of electromagnetic radiation sources; and an optical fiber receiving electromagnetic radiation from the one or more dichroic beam splitters.

12. The system of claim 2 further comprising:
a housing comprising:
a top portion;
a handle portion joined to said top portion;
said top portion having an opening at an upper end;
wherein the detecting component is disposed inside said housing and receives reflected/scattered electromagnetic radiation from the area of interest; and wherein said number of electromagnetic radiation sources are optically disposed such that said number of electromagnetic radiation sources illuminate the area of interest through said opening; and
wherein weights and dimensions of the housing and components in the housing being selected to enable the housing and components in the housing to be handheld.

13. The system of claim 12 wherein the detecting component receives electromagnetic radiation through said opening.

14. The system of claim 12 wherein the detecting component receives electromagnetic radiation through another opening.

15. The system of claim 12 wherein said weight scat most 10 pounds.

16. The system of claim 12 wherein said electromagnetic radiation sources are disposed inside said housing.

17. The system of claim 12 Wherein said electromagnetic radiation sources are optically coupled to said housing.

18. The system of claim 12 wherein said handle portion is embodied in said top portion.

19. The system of claim 1 wherein said each one of the number of the electromagnetic radiation sources sequentially illuminates the area of interest; and wherein processing comprises using a lock-in detector in order to obtain the data at said each wavelength from the number of wavelengths.

20. The system of claim 1 wherein said each one of the number of the electromagnetic radiation sources substantially simultaneously illuminates the area of interest; and wherein processing comprises using a discrete Fourier transform (DFT) in order to obtain the data at each wavelength from the plurality of wavelengths; a wavelength range of said plurality of wavelengths being substantially equal to a wavelength range of said number of wavelengths.

21. The system of claim 1 further comprising a targeting component configured to identify a location at which detection occurs.

22. The system of claim 21 wherein the targeting component comprises one of a camera responsive to a wavelength range substantially not detectable by the non-pixelated detecting component, night vision goggles, or a cross-hair sight.

23. The system of claim 2 wherein a wavelength range of said number of wavelengths comprises a range from about 1.1 micron to about 1.4 micron.

24. A method for detecting concealed objects, the method comprising:
illuminating, from a number of electromagnetic radiation sources, an area of interest with electromagnetic radiation;
each electromagnetic radiation source emitting electromagnetic radiation at substantially one wavelength from a number of wavelengths; the electromagnetic radiation being modulated with respect to time; at least some of the number of wavelengths substantially coinciding with wavelengths in an absorption spectrum of predetermined materials;
detecting reflected/scattered electromagnetic radiation from the area of interest; the reflected/scattered electromagnetic radiation from the area of interest being detected by a non-pixelated detecting component comprising a photo-detecting component and an electronic readout subcomponent; an output of the photo detecting component being AC coupled to the electronic readout subcomponent;

processing an output of the non-pixelated detecting component in order to obtain data at each wavelength from a plurality of wavelengths, the output of the non-pixelated detecting component obtained by the illuminating; the output of the non-pixelated detecting component, after processing, constituting a vector of processed data at the plurality of wavelengths; and comparing, the vector of processed data to a predetermined vector corresponding to a predetermined material;

presence of the predetermined material being determined said comparing.

25. The method of claim 24 wherein processing and comparing comprise:

subtracting a background value from a value for detected reflected/scattered electromagnetic radiation; the subtraction producing a background subtracted value;

obtaining a number of ratio values, each ratio value being a ratio of a background subtracted value at one wavelength from the number of wavelengths to a background subtracted value at a selected wavelengths from the plurality of wavelengths;

obtaining a measure of a portion of the number of ratio values located along predetermined values at the number of wavelengths for predetermined materials;

a presence of said predetermined materials being ascertainable from said measure.

26. The method of claim 25 further comprising:

monitoring emission for each electromagnetic radiation source; the monitoring providing a measure of emission for said each exposure; and normalizing the background subtracted value with respect to a difference between a value for the measure of emission and a measure of background electromagnetic radiation.

27. The method of claim 24 wherein said each one of the number of the electromagnetic radiation sources sequentially illuminates the area of interest; and wherein processing comprises using a lock-in detector in order to obtain the data at said each wavelength from the number of wavelengths; the number of wavelengths being the plurality of wavelengths.

28. The method of claim 24 wherein said each one of the number of the electromagnetic radiation sources sequentially illuminates the area of interest; and wherein processing comprises using a discrete Fourier transform (DFT) in order to obtain the data at each wavelength from the plurality of wavelengths; a wavelength range of said plurality of wavelengths being substantially equal to a wavelength range of said number of wavelengths.

29. The method of claim 24 wherein a wavelength range of said number of wavelengths comprises a range from about 1.1 micron to about 1.4 micron.

* * * * *

UNITED STATES PATENT AND TRADEMARK OFFICE
CERTIFICATE OF CORRECTION

PATENT NO. : 9,310,512 B1  
APPLICATION NO. : 14/821172  
DATED : April 12, 2016  
INVENTOR(S) : James A. Kane et al.

Page 1 of 1

It is certified that error appears in the above-identified patent and that said Letters Patent is hereby corrected as shown below:

In the Claims

In column 20, line 36 (claim 1), "non-pixelated pixelated detecting component," should read -- non-pixelated detecting component, --

In column 20, line 40 (claim 1), "a predetermined or" should read -- a predetermined material; --

In column 20, line 51 (claim 3), "The system or claim 2" should read -- The system of claim 2 --

Signed and Sealed this
Fourteenth Day of June, 2016

Michelle K. Lee
*Director of the United States Patent and Trademark Office*